United States Patent
Mulzer et al.

(10) Patent No.: US 12,024,640 B2
(45) Date of Patent: Jul. 2, 2024

(54) UV-CURING RESIN COMPOSITIONS FOR HARD COAT APPLICATIONS

(71) Applicants: Rohm and Haas Electronic Materials LLC, Marlborough, MA (US); DuPont Electronics, Inc., Wilmington, DE (US)

(72) Inventors: Michael Mulzer, Pickerington, OH (US); Kenneth Hernandez, Ashland, MA (US); Andrew Stella, Marlborough, MA (US); Lujia Bu, Southborough, MA (US); Jieqian Zhang, Southborough, MA (US); Deyan Wang, Hudson, MA (US); Yinjie Cen, Shrewsbury, MA (US)

(73) Assignee: DUPONT ELECTRONICS INC., Wilmington, DE (US)

( * ) Notice: Subject to any disclaimer, the term of this patent is extended or adjusted under 35 U.S.C. 154(b) by 146 days.

(21) Appl. No.: 17/504,019

(22) Filed: Oct. 18, 2021

(65) Prior Publication Data

US 2023/0124713 A1    Apr. 20, 2023

(51) Int. Cl.
| | |
|---|---|
| *C08F 2/46* | (2006.01) |
| *C08F 2/50* | (2006.01) |
| *C08G 61/04* | (2006.01) |
| *C09D 133/08* | (2006.01) |
| *C08K 3/22* | (2006.01) |

(52) U.S. Cl.
CPC .............. *C09D 133/08* (2013.01); *C08K 3/22* (2013.01); *C08K 2003/2227* (2013.01)

(58) Field of Classification Search
CPC .......... C09D 4/00; C09D 133/08; C08K 3/22; C08K 3/26; C08K 2201/011; C08K 2003/2227; C08F 230/08; C08F 222/1006; C08F 222/103
USPC ................. 522/81, 71, 1, 6, 189, 184; 520/1
See application file for complete search history.

(56) References Cited

U.S. PATENT DOCUMENTS

| | | | |
|---|---|---|---|
| 6,265,476 B1 | 7/2001 | Krongauz et al. | |
| 6,489,376 B1 | 12/2002 | Khudyakov et al. | |
| 8,163,357 B2 | 4/2012 | Engardio et al. | |
| 8,921,441 B2 | 12/2014 | Bae et al. | |
| 2014/0120469 A1 | 5/2014 | Prokopowicz et al. | |
| 2016/0145449 A1 | 5/2016 | Hilgers | |
| 2016/0369104 A1 | 12/2016 | Gu et al. | |
| 2017/0015851 A1 | 1/2017 | Sloan | |
| 2017/0204290 A1* | 7/2017 | Simoff | ............... C09D 183/06 |
| 2018/0313978 A1* | 11/2018 | Chang | .................. G02B 1/14 |
| 2021/0115289 A1 | 4/2021 | Bu et al. | |

FOREIGN PATENT DOCUMENTS

| | | | |
|---|---|---|---|
| CN | 110669423 A | | 1/2020 |
| CN | 112094588 A | | 12/2020 |
| CN | 112225901 A | | 1/2021 |
| JP | 2004083626 | * | 3/2004 |
| JP | 2015096559 | * | 5/2015 |
| KR | 1020160051481 | * | 5/2016 |
| KR | 1020170040599 | * | 4/2017 |

OTHER PUBLICATIONS

Yokoshima, JP 2004-083626 Machine Translation, Mar. 18, 2004 (Year: 2004).*
Hoshino et al, JP 2015-096556 Machine Translation, May 21, 2015 (Year: 2015).*
Chun et al, KR 1020160051481 Machine Translation, May 11, 2016 (Year: 2016).*
Lee et al (KR 1020170040599 Machine Translation, Apr. 13, 2017 (Year: 2017).*
Husar, B. et al. Prog. Org. Coatings 2014, 77, 1789-1798.
Li, Y. et al. Poly. Chem. 2014, 5, 6151-6162.
Lewandowska, A. et al. Polymers 2021, 13, 385.

* cited by examiner

*Primary Examiner* — Jessica Whiteley

(74) *Attorney, Agent, or Firm* — G. Creston Campbell

(57) ABSTRACT

Disclosed is an actinic radiation curable (meth)acrylic composition for use in hardcoats for optical displays containing one or more multifunctional (meth)acrylate monomers, one or more Si-containing (meth)acrylate monomers, one or more UV radical initiators, one or more monomers to improve surface cure, nanoparticles, and one or more organic solvents. Coated hardcoat articles made from this composition exhibit improved properties for use in display applications.

5 Claims, 6 Drawing Sheets

UV-CURING RESIN COMPOSITIONS FOR HARD COAT APPLICATIONS

FIELD

The present invention relates to compositions for use in ultraviolet (UV) curing coatings. More particularly, it relates to compositions comprising a UV curing reaction mixture of multi-ethylenically unsaturated (meth)acrylates, such UV curing reaction mixture being particularly suitable for use as an optically clear hard coat with superior fingerprint and abrasion resistance.

BACKGROUND

Smart phones and other mobile or portable devices are equipped with an optical display having a touch sensor with an exposed viewing surface made from glass or clear plastic films. These display surfaces have either poor impact resistance or poor abrasion resistance. During use, the viewing face of the display is susceptible to cracks, scratches, abrasion, and smudges, which can cause the display to lose resolution and clarity, and sometimes become unreadable or inoperative. To protect such displays, multilayer protective films or coatings have been used containing a hard coat, base substrate and an optical adhesive. The hard coat provides hardness, scratch resistance and finger print removal; the base substrate provides impact resistance; and the adhesive ensures that the film firmly attaches to the device screen.

Recently, flexible and curved displays have emerged in smartphones, in part leading to increasing demand for flexible and/or curved hard coat films to protect the display top surface. Such hard coat films can be fabricated via a number of methods. However, conventional hard coat films are generally too rigid for use in these more advanced displays and can be too soft for protecting optical displays rendering them highly susceptible to surface damage and the resulting decrease in overall optical quality of the display device.

U.S. Pat. No. 6,489,376, to Khudyakov et al., discloses UV-curable coating compositions comprising (a) a radiation curable oligomer, such as 50 to 95 wt. % of monomers, of a urethane acrylate oligomer, (b) a photoinitiator, and (c) a mixture of reactive diluents, such as in the amount of from 5 to 50 wt. % of monomers, comprising (i) at least one mono- or di-functional reactive diluent monomer and (ii) at least one polyfunctional reactive diluent. The compositions provide hard coats for optical fiber. Difunctional urethane acrylates are disclosed which are urethane oligomers that contain two or more urethane linkages. The compositions fail to provide adequate combination of hardness and flexibility needed for use in making flexible or curved films that behave like hard coats for protecting flat optical displays.

U.S. Pat. No. 6,265,476 discloses radiation-curable binder compositions containing (a) a polymer, oligomer or monomer having at least one (meth)acrylate group, (b) an oligomer or monomer, exclusive of (meth)acrylate functional groups, having an ethylenically unsaturated functional group, and (c) an elongation promoter. The elongation promoter may be a sulfur-containing elongation promoter which is, upon exposure to radiation, able to react with the oligomer or monomer which is not a (meth)acrylate. The compositions fail to provide adequate combination of hardness and flexibility needed for use in making flexible or curved films that behave like hard coats for protecting flat optical displays.

A goal of the present work is to provide compositions for use in the production of optical-display flexible hardcoats with high hardness that also offer high fingerprint resistance and excellent durability against scratches and abrasions. Fingerprint resistance can be assessed by measuring the water-contact angle (WCA) of a surface—a WCA greater than 1000 is generally viewed as providing a nominal amount of resistance for many applications. Scratch resistance can be determined in a number of ways, but a typical test involves passing a pad of steel wool (SW) over a hardcoat layer (using a defined contact-size, pressure, speed etc.) and determining the change in WCA. A typical failure criterion is a drop below 100°. Flexible hardcoats that offer best-in-class performance can be characterized by an initial WCA of 1150 or higher (similar to the WCA of treated glass used for flat, rigid mobile phones) and a minimal drop in WCA after steel wool scratch test.

A typical approach to achieving a high WCA and anti-scratch properties in acrylate-based UV-curable hardcoats is the addition of a highly-fluorinated, acrylate-functionalized surfactant to a given hardcoat formulation. Surface energy drives the migration of the surfactant to the surface of the hardcoat layer during the coating processes. Several such surfactants are commercially available, and this formulation approach is currently the standard way to achieve a high initial WCA and scratch resistance in flexible hardcoat articles. Typically, the relatively-high fluorine content in these surfactants generates an increased WCA of the final coating. This approach is ultimately limited, however, by the solubility of the surfactant in typical organic formulations solvents, and in practice the highest achievable WCA is 1100+/−1°.

In order to achieve an even-higher initial WCA, a highly-fluorinated silane reagent (also known as an "AF" or "anti-fingerprint" agent) can be added as a separate layer onto the cured hardcoat formulated without a fluorinated surfactant to achieve an initial WCA around 116°. However, the adhesion of such a highly-fluorinated layer to the hardcoat is generally poor because these highly-fluorinated, commercially-available silane reagents were originally designed to functionalize glass surfaces through the reaction of silanol groups contained on the glass surface. Consequently, an acrylate hardcoat containing a separately coated fluorinated layer fails rather quickly in steel wool scratch tests. There is thus clearly a need for plastic hardcoats with a WCA similar to that of treated glass-surfaces (i.e. 1150 or higher) and good scratch resistance. Critical to meeting this need is the achievement of good adhesion between a plastic hardcoat (typically acrylate-based) and a highly-fluorinated silane reagent.

DETAILED DESCRIPTION

Figure 1:
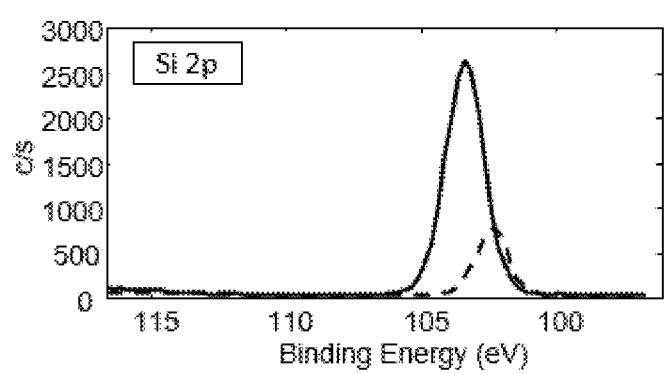
FIGS. 1 and 2 are XPS traces showing the amount of silicon and carbon detected in the silane-surface layer, respectively, before (dashed) and after (solid) plasma treatment of the silane surface described in Example 10.

Before explaining at least one embodiment of the present disclosure in detail, it is to be understood that the present disclosure is not limited in its application to the details of construction and the arrangement of the components or steps or methodologies set forth in the following description. The present disclosure is capable of other embodiments or of being practiced or carried out in various ways. Also, it is to be understood that the phraseology and terminology employed herein is for the purpose of description and should not be regarded as limiting.

Unless otherwise defined herein, technical terms used in connection with the present disclosure shall have the meanings that are commonly understood by those of ordinary skill in the art. Further, unless otherwise required by context, singular terms shall include pluralities and plural terms shall include the singular.

All patents, published patent applications, and non-patent publications mentioned in the specification are indicative of the level of skill of those skilled in the art to which the present disclosure pertains. All patents, published patent applications, and non-patent publications referenced in any portion of this application are herein expressly incorporated by reference in their entirety to the same extent as if each individual patent or publication was specifically and individually indicated to be incorporated by reference.

All of the articles and/or methods disclosed herein can be made and executed without undue experimentation in light of the present disclosure. While the articles and methods of the present disclosure have been described in terms of preferred embodiments, it will be apparent to those of ordinary skill in the art that variations may be applied to the articles and/or methods and in the steps or in the sequence of steps of the method(s) described herein without departing from the concept, spirit and scope of the present disclosure. All such similar substitutes and modifications apparent to those skilled in the art are deemed to be within the spirit, scope and concept of the present disclosure.

As utilized in accordance with the present disclosure, the following terms, unless otherwise indicated, shall be understood to have the following meanings.

The use of the word "a" or "an" when used in conjunction with the term "comprising" may mean "one," but it is also consistent with the meaning of "one or more," "at least one," and "one or more than one." The use of the term "or" is used to mean "and/or" unless explicitly indicated to refer to alternatives only if the alternatives are mutually exclusive, although the disclosure supports a definition that refers to only alternatives and "and/or." Throughout this application, the term "about" is used to indicate that a value includes the inherent variation of error for the quantifying device, the method(s) being employed to determine the value, or the variation that exists among the study subjects. For example, but not by way of limitation, when the term "about" is utilized, the designated value may vary by plus or minus twelve percent, or eleven percent, or ten percent, or nine percent, or eight percent, or seven percent, or six percent, or five percent, or four percent, or three percent, or two percent, or one percent. The use of the term "at least one" will be understood to include one as well as any quantity more than one, including but not limited to, 1, 2, 3, 4, 5, 10, 15, 20, 30, 40, 50, 100, etc. The term "at least one" may extend up to 100 or 1000 or more depending on the term to which it is attached. In addition, the quantities of 100/1000 are not to be considered limiting as lower or higher limits may also produce satisfactory results. In addition, the use of the term "at least one of X, Y, and Z" will be understood to include X alone, Y alone, and Z alone, as well as any combination of X, Y, and Z.

As used herein, the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps. The terms "or combinations thereof" and "and/or combinations thereof" as used herein refer to all permutations and combinations of the listed items preceding the term. For example, "A, B, C, or combinations thereof" is intended to include at least one of: A, B, C, AB, AC, BC, or ABC and, if order is important in a particular context, also BA, CA, CB, CBA, BCA, ACB, BAC, or CAB. Continuing with this example, expressly included are combinations that contain repeats of one or more items or terms, such as BB, AAA, AAB, BBC, AAABCCCC, CBBAAA, CABABB, and so forth. The skilled artisan will understand that typically there is no limit on the number of items or terms in any combination, unless otherwise apparent from the context.

As used herein, the term "substantially" means that the subsequently described circumstance completely occurs or that the subsequently described circumstance occurs to a great extent or degree.

For purposes of the following detailed description, other than in any operating examples, or where otherwise indicated, numbers that express, for example, quantities of ingredients used in the specification and claims are to be understood as being modified in all instances by the term "about." The numerical parameters set forth in the specification and attached claims are approximations that may vary depending upon the desired properties to be obtained in carrying out the invention.

The term "actinic radiation" refers to electromagnetic radiation that can produce photochemical or photobiological reactions when absorbed by one or more chemical or biological species.

The term "alicyclic" refers to a cyclic group that is not aromatic. The group can be saturated or unsaturated, but it does not exhibit aromatic character.

The term "alkyl" refers to a saturated linear or branched hydrocarbon group of 1 to 50 carbons. It further includes both substituted and unsubstituted hydrocarbon groups. The term is further intended to include heteroalkyl groups.

The term "aromatic compound" refers to an organic compound comprising at least one unsaturated cyclic group having 4n+2 delocalized pi electrons. The term is intended to encompass both aromatic compounds having only carbon and hydrogen atoms, and heteroaromatic compounds wherein one or more of the carbon atoms within the cyclic group has been replaced by another atom, such as nitrogen, oxygen, sulfur, or the like.

The term "aryl" or "aryl group" refers to a moiety formed by removal of one or more hydrogen ("H") or deuterium ("D") from an aromatic compound. The aryl group may be a single ring (monocyclic) or have multiple rings (bicyclic, or more) fused together or linked covalently. A "carbocyclic aryl" has only carbon atoms in the aromatic ring(s). A "heteroaryl" has one or more heteroatoms in at least one aromatic ring.

The term "alkoxy" refers to the group —OR, where R is alkyl.

The term "aryloxy" refers to the group —OR, where R is aryl.

Unless otherwise indicated, all groups can be substituted or unsubstituted. An optionally substituted group, such as, but not limited to, alkyl or aryl, may be substituted with one or more substituents which may be the same or different. Suitable substituents include alkyl, aryl, nitro, cyano, —N(R')(R"), halo, hydroxy, carboxy, alkenyl, alkynyl, cycloalkyl, heteroaryl, alkoxy, aryloxy, heteroaryloxy, alkoxycarbonyl, perfluoroalkyl, perfluoroalkoxy, arylalkyl, silyl, siloxy, siloxane, thioalkoxy, —S(O)$_2$—, —C(=O)—N(R')(R"), (R')(R")N-alkyl, (R')(R")N-alkoxyalkyl, (R')(R")N-alkylaryloxyalkyl, —S(O)s-aryl (where s=0-2) or —S(O)$_s$-heteroaryl (where s=0-2). Each R' and R" is independently an optionally substituted alkyl, cycloalkyl, or aryl group. R' and R", together with the nitrogen atom to which they are bound, can form a ring system in certain embodiments. Substituents may also be crosslinking groups.

The term "carbamate" refers to a urethane or (—RN-COOR'—) group which is the reaction product of an isocyanate group RNCO and an alcohol R'OH or other active hydrogen.

The term "coating" refers to a covering that is applied to the surface of an object that is usually referred to as the "substrate." Coatings may have various thicknesses and other properties, depending on the end-use appropriate for a given situation. In some non-limiting embodiments; the coating/substrate combination is used as a single unit, while in some embodiments, the coating is removed from the substrate for stand-alone use. In some non-limiting embodiments, the thus-removed coating is referred to as a film, a thin film, an optical thin film, or the like. A coating is considered optically transparent if it exhibits an average light transmittance of at least 80%, and preferably at least 85% over the wavelength range of 380-700 nm.

The term "hardcoat" refers to a coating exhibiting specific hardness properties as determined via any number of tests that are familiar to those skilled in the art. In some non-limiting embodiments, "pencil hardness" is one such measure. The measured hardness of a specific coating can make it more or less well-suited for specific applications that are generally known to those with skill in the arts in which the coating might find use. The term "coated hardcoat article" as used herein refers to a hardcoat layer that is applied to one or more surfaces of an object that is usually referred to as the "substrate." Although not specifically mentioned, additional layers such as anti-glare or anti-reflective layers could be part of a coated hardcoat article and could be situated on the hardcoat or between the hardcoat and the substrate.

The term "cosolvent" refers to substances added to a primary solvent intended to increase the solubility of poorly-soluble compounds. Alcohols may be used as cosolvents to dissolve hydrophobic molecules in a number of applications that are known to those with skill in the art. In some non-limiting embodiments, cosolvents are added to solvents in amounts such that they comprise from 0.05% to 30% by weight of the solvent component of a composition, mixture, or formulation.

The term "crosslinker" or "cross-linking reagent" refers to a molecule that contains two or more reactive ends capable of chemically attaching to specific functional groups on molecules or polymers. The crosslinked molecules or polymers are chemically joined together by one or more covalent bonds.

The term "curing" refers to a process during which a chemical reaction or physical action takes place; resulting in a harder, tougher, or more stable linkage or substance. In polymer chemistry, "curing" specifically refers to the toughening or hardening of a polymer via cross-linking of polymer chains. Curing processes may be brought about by electron beams, radiation, heat, and/or chemical additives.

The term "fused," when applied to aromatic or alicyclic rings refers to an aromatic or alicyclic species that contains two or more joined rings that may share a single atom, two adjacent atoms, or 3 or more atoms.

The term "glass transition temperature (or $T_g$)" refers to the temperature at which a reversible change occurs in an amorphous polymer or in amorphous regions of a semi-crystalline polymer where the material changes suddenly from a hard, glassy, or brittle state to one that is flexible or elastomeric. Microscopically, the glass transition occurs when normally-coiled, motionless polymer chains become free to rotate and can move past each other. $T_g$'s may be measured using differential scanning calorimetry (DSC), thermo-mechanical analysis (TMA), dynamic-mechanical analysis (DMA), or other methods. The term "calculated glass transition temperature (or calculated $T_g$)" refers to the Tg obtained from the Flory-Fox equation:

$$\frac{1}{T_g} = \frac{w_1}{T_{g1}} + \frac{w_2}{T_{g2}}$$

for a polymeric composition containing weight percentages w1 and w2 of monomers 1 and 2.

The term "matrix" refers to a foundation on which one or more layers is deposited in the formation of, for example, an electronic device. Non-limiting examples include glass, silicon, and others.

The term "(meth)acrylate" refers to any of an acrylate, a methacrylate, and mixtures thereof.

The term "monomer" refers to a molecule that chemically bonds during polymerization to one or more monomers of the same or different kind to form a polymer.

As used herein, the term "number of ethylenically unsaturated groups" in a multi-ethylenically unsaturated (meth)acrylate composition refers to the number of (meth)acrylate groups in that monomer according to the monomer or oligomer supplier's product literature. If such number is not available, it refers to the number of the number of (meth)acrylate groups as determined by any common spectroscopic analytical technique such as NMR spectroscopy.

The term "nonpolar" refers to a molecule, solvent, or other species in which the distribution of electrons between covalently-bonded atoms is even and there is thus no net electrical charge across them. In some embodiments; nonpolar molecules, solvents, or other species are formed when constituent atoms have the same or similar electronegativities.

The term "oligomer" refers to a molecule having from 3 to 200 polymerized monomer units, in some non-limiting embodiments at least 5, in some non-limiting embodiments at least 7; in some non-limiting embodiments no more than 175, in some non-limiting embodiments no more than 150.

The term "polar" refers to a molecule, solvent, or other species in which the distribution of electrons between covalently-bonded atoms is not even. Such species therefore exhibit a large dipole moment which may result from bonds between atoms characterized by significantly-different electronegativities.

The term "polymer" refers to a large molecule comprising one or more types of monomer residues (repeating units) connected by covalent chemical bonds. By this definition, a polymer encompasses compounds wherein the number of monomer units may range from very few, which more commonly may be called as oligomers, to very many. Non-limiting examples of polymers include homopolymers and non-homopolymers such as copolymers, terpolymers, tetrapolymers and the higher analogues.

The term "protic" refers to a class of solvents that contain an acidic hydrogen atom and are therefore capable of acting as hydrogen donors. Common protic solvents include formic acid, n-butanol, isopropanol, ethanol, methanol, acetic acid, water, propylene glycol methyl ether (PGME), and others. Protic solvents can be used individually or in various combinations.

The term "monoprotic" refers to a class of protic solvents that contain a single acid hydrogen.

The term "reacted isocyanate (carbamate) content" means any carbamate (—NCOO—) group which has formed a urethane and includes the weight of the NCO moiety in the urethane as well as a single extra oxygen but not the corresponding hydrocarbyl or active hydrogen substituents of the carbamate, such as a polymer dial, or the content thereof.

The term "satisfactory," when regarding a materials property or characteristic, is intended to mean that the property or characteristic fulfills all requirements/demands for the material in-use.

As used herein, the term "solids" refers to any material other than water and ammonia that does not volatilize in use conditions, no matter what its physical state, and including all oligomers, monomers, and non-volatile additives. "Solids" excludes water and volatile solvents. Thus, liquid reactants that do not volatilize under in-use conditions are considered "solids."

The term "solubility" refers to the maximum amount of solute that can be dissolved in a solvent at a given temperature. In some embodiments, solubility may be measured or assessed by any number of qualitative or quantitative methods.

The term "substrate" refers to a base material that can be rigid, thermoformable, or flexible and may include one or more layers of one or more materials, which can include, but are not limited to, glass, polymer, metal or ceramic materials or combinations thereof. The substrate may or may not include electronic components, circuits, or conductive members.

As used herein, the term "flexible substrate" refers to a substrate capable of being bent or molded around a radius of <2 mm numerous times without breaking, permanent deformation, haze formation, crease formation, fracture, crack formation, or the like. One suitable test for flexible substrates is whether the substrate can endure 100,000 or more bending cycles around a 2-mm radius at a frequency of 1 Hz. Exemplary flexible substrates include, but are not limited to, polyimide substrates, polyethylene-terephthalate substrates, polyethylene naphthalate substrates, polycarbonate substrates, poly(methyl methacrylate) substrates, polyethylene substrates, polypropylene substrates, cyclic olefin copolymer substrates, polysulfone substrates, polyamide substrates, and combinations thereof. The thickness of the substrate is not specifically limited.

As used herein, the term "volatile" refers to a substance, often a liquid, that can be easily evaporated under what are considered standard conditions of temperature and pressure.

As used herein, the term "thermal acid generator" refers to a compound or compounds that, when heated, are capable of producing a strong acid or acids having a pKa of 2.0 or less. In one non-limiting embodiment, the thermal acid generator comprises a salt wherein a volatile base (e.g., pyridine) buffers a superacid (e.g., a sulfonate), and the mixture is heated above the heat of decomposition of the salt and the boiling point of the buffering base to remove the buffer and yield the strong acid. In another non-limiting embodiment, a thermal acid generator comprises a thermally-unstable buffer that breaks down upon heating to produce a strong acid. The use of thermal acid generators in electronics and displays applications described is described, for example, in U.S. 2014-0120469. A variety of thermal acid generators is commercially available.

In a structure where a substituent bond passes through one or more rings as shown below,

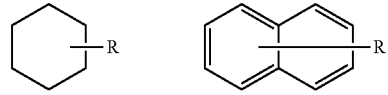

it is meant that the substituent R may be bonded at any available position on the one or more rings.

The phrase "adjacent to," when used to refer to layers in a device, does not necessarily mean that one layer is immediately next to another layer. On the other hand, the phrase "adjacent R groups," is used to refer to R groups that are next to each other in a chemical formula (i.e., R groups that are on atoms joined by a bond). Exemplary adjacent R groups are shown below:

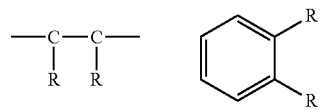

All percentages, ratios, and proportions used herein are based on weight unless otherwise specified. All operations are at room temperature (20-25° C.) unless otherwise specified.

As used throughout this specification, the following abbreviations shall have the following meanings, unless the context clearly indicates otherwise: ° C.=degree Celsius; g=gram; nm=nanometer, µm=micron=micrometer; mm=millimeter; sec.=second; and min.=minutes. All amounts are percent by weight ("wt %") and all ratios are molar ratios, unless otherwise noted. All numerical ranges are inclusive and combinable in any order, except where it is clear that such numerical ranges are constrained to added up to 100%. Unless otherwise noted, all polymer and oligomer molecular weights are weight average molecular weights ('Mw") and are determined using gel permeation chromatography compared to polystyrene standards.

It will be understood that although the terms first, second, third, etc. may be used herein to describe various elements, components, regions, layers and/or sections, these elements, components, regions, layers, and/or sections should not be limited by these terms. These terms are only used to distinguish one element, component, region, layer or section from another element, component, region, layer or section. Thus, a first element, component, region, layer or section could be termed a second element, component, region, layer or section without departing from the teachings of the present invention. Similarly, the terms "top" and "bottom" are only relative to each other. It will be appreciated that when an element, component, layer or the like is inverted, what was the "bottom" before being inverted would be the "top" after being inverted, and vice versa. When an element is referred to as being "on" or "disposed on" another element, it can be directly on the other element or intervening elements may be present therebetween. In contrast, when an element is referred to as being "directly on" or "disposed directly on" another element, there are no intervening elements present.

The present invention provides an actinic radiation curable (meth)acrylic composition for use in hardcoats for optical displays comprising: (a) one or more multifunctional (meth)acrylate monomers; (b) one or more Si-containing (meth)acrylate monomers; (c) one or more UV radical initiators; (d) one or more monomers to improve surface cure; (e) nanoparticles, and (f) one or more organic solvents.

The present invention further provides an actinic radiation curable (meth)acrylic composition for use in hardcoats for optical displays comprising: (a) one or more multifunctional (meth)acrylate monomers; (b) one or more (meth)acrylate monomers containing an isocyanurate group; (c) one or more aliphatic urethane (meth)acrylate functional oligomers having from 6 to 24 (meth)acrylate groups; (d) one or more Si-containing (meth)acrylate monomers; (e) one or more UV radical initiators; (f) one or more monomers to improve surface cure; (g) nanoparticles; and (h) one or more organic solvents.

In some non-limiting embodiments, the actinic radiation curable (meth)acrylate composition comprises one or more multifunctional (meth)acrylate reactive monomers; in some non-limiting embodiments two or more multifunctional (meth)acrylate reactive monomers; in some non-limiting embodiments three or more multifunctional (meth)acrylate reactive monomers; and in some non-limiting embodiments four or more multifunctional (meth)acrylate reactive monomers.

In some non-limiting embodiments, the one or more multifunctional (meth)acrylate monomers are selected from the group consisting of aromatic multifunctional (meth)acrylate monomers, aliphatic multifunctional (meth)acrylate monomers, and combinations thereof, in some non-limiting embodiments the one or more multifunctional (meth)acrylate monomers are aromatic multifunctional (meth)acrylate monomers; in some non-limiting embodiments the one or more multifunctional (meth)acrylate monomers are aliphatic multifunctional (meth)acrylate monomers. In some non-limiting embodiments, the one or more multifunctional (meth)acrylate monomers are selected from the group consisting of trifunctional (meth)acrylate monomers, tetrafunctional (meth)acrylate monomers, pentafunctional (meth)acrylate monomers, hexafunctional (meth)acrylate monomers, and higher (meth)acrylate monomers. In some non-limiting embodiments, the one or more multifunctional (meth)acrylate monomers are selected from the group consisting of aliphatic tetrafunctional (meth)acrylate monomers, aliphatic pentafunctional (meth)acrylate monomers, aliphatic hexafunctional (meth)acrylate monomers, and combinations thereof. In some non-limiting embodiments, the one or more multifunctional (meth)acrylate monomers are selected from the group consisting of aromatic tetrafunctional (meth)acrylate monomers, aromatic pentafunctional (meth)acrylate monomers, aromatic hexafunctional (meth)acrylate monomers, and combinations thereof.

In some non-limiting embodiments, the one or more multifunctional (meth)acrylate monomers are selected from the group consisting of mixtures of primarily dipentaerythritol tetraacrylate, dipentaerythritol pentaacrylate, dipentaerythritol hexaacrylate (SR399 and SR399LV from Sartomer), or hyperbranched polyester acrylates (CN2301, CN2302, CN2303, CN2304, CN2300 from Sartomer), trimethylolpropane triacrylate, trimethylolpropane (EO)$_3$ triacrylate, trimethylolpropane (EO)$_6$ triacrylate, trimethylolpropane (EO)$_9$ triacrylate, trimethylolpropane (EO)$_{15}$ triacrylate, glycerine (PO)3 triacrylate, pentaerythritol triacrylate, trimethylolpropane (PO)$_3$ triacrylate, pentaerythritol (EO)n tetraacrylate, ditrimethylyolpropane tetraacrylate, pentaerythritol tetraacrylate, dipentaerythritol tetraacrylate, dipentaerythritol pentaacrylate, dipentaerythritol hexaacrylate, dipentaerythritol triacrylate, trifunctional polyester acrylate, tetrafunctional polyester acrylate, hexafunctional polyester acrylate, dipentaerythritol (EO)$_n$ hexaacrylate, dipentaerythritol (EO)$_n$ pentaacrylate, dipentaerythritol (PO)$_n$ hexaacrylate, dipentaerythritol (PO)$_n$ pentaacrylate, and combinations thereof. EO and PO represent polymerized units of ethylene oxide and propylene oxide, respectively.

In some non-limiting embodiments of the actinic radiation curable (meth)acrylic composition for use in hardcoats for optical displays disclosed herein, the composition comprises from 1 to 99 wt. % of the one or more multifunctional (meth)acrylate monomers based on the total weight of monomer solids; in some non-limiting embodiments from 5 to 95 wt. %; in some non-limiting embodiments from 9 to 80 wt. %; in some non-limiting embodiments from 9 to 70 wt. %; in some non-limiting embodiments from 9 to 60 wt. %; in some non-limiting embodiments from 10 to 50 wt. %; and in some non-limiting embodiments from 15 to 45 wt. %.

In some non-limiting embodiments, the actinic radiation curable (meth)acrylate composition comprises one or more (meth)acrylate monomers containing an isocyanurate group; in some non-limiting embodiments two or more (meth)acrylate monomers containing an isocyanurate group; in some non-limiting embodiments three or more (meth)acrylate monomers containing an isocyanurate group; and in some non-limiting embodiments four or more (meth)acrylate monomers containing an isocyanurate group.

In some non-limiting embodiments, the one or more (meth)acrylate monomers containing an isocyanurate group are selected from the group consisting of derivates of 1,3,5-tris(2-hydroxyethyl)-1,3,5-triazinane-2,4,6-trione.

In some non-limiting embodiments, the one or more (meth)acrylate monomers comprising an isocyanurate group are selected from the group consisting of 2-propenoic acid, 1,1',1"-[(2,4,6-trioxo-1,3,5-triazine-1,3,5(2H,4H,6H)-triyl) tri-2,1-ethanediyl]ester (Photomer® 4356); 2-propenoic acid, 1,1'-[[dihydro-5-(2-hydroxyethyl)-2,4,6-trioxo-1,3,5-triazine-1,3(2H,4H)-diyl]di-2,1-ethanediyl]ester; 2-propenoic acid, 2-methyl-, 1,1',1"-[(2,4,6-trioxo-1,3,5-triazine-1,3,5(2H,4H,6H)-triyl)tri-2,1-ethanediyl]ester; Hexanoic acid, 6-[(1-oxo-2-propen-1-yl)oxy]-, 2-[tetrahydro-2,4,6-trioxo-3,5-bis[2-[(1-oxo-2-propen-1-yl)oxy]ethyl]-1,3,5-triazin-1(2H)-yl]ethyl ester; hexanoic acid, 6-[(1-oxo-2-propen-1-yl)oxy]-, 1,1',1"-[(2,4,6-trioxo-1,3,5-triazine-1,3,5 (2H,4H,6H)-triyl)tri-2,1-ethanediyl]ester; 2-propenoic acid, 2-methyl-, 1,1',1"-[(2,4,6-trioxo-1,3,5-triazine-1,3,5(2H,4H, 6H)-triyl)tris[6,1-hexanediylimino-carbonyloxy[2-[[(1-oxo-2-propen-1-yl)oxy]methyl]-2,1-ethanediyl]]]ester; poly (oxy-1,2-ethanediyl), α,α',α"-[(2,4,6-trioxo-1,3,5-triazine- 1,3,5(2H,4H,6H)-triyl)tris(6,1-hexanediyliminocarbonyl)]tris[ω-[(2-methyl-1-oxo-2-propen-1-yl)oxy]-; 2-propenoic acid, 2-[tetrahydro-3,5-bis(2-oxiranylmethyl)-2,4,6-trioxo-1,3,5-triazin-1(2H)-yl]ethyl ester; 2-propenoic acid, 2-methyl-, 2-[tetrahydro-3,5-bis(2-oxiranylmethyl)-2,4,6-trioxo-1,3,5-triazin-1(2H)-yl]ethyl ester; 2-propenoic acid, and 2-methyl-, 1,1'-[[dihydro-5-(2-hydroxyethyl)-2,4,6-trioxo-1,3,5-triazine-1,3(2H,4H)-diyl]di-2,1-ethanediyl]ester.

In some non-limiting embodiments of the actinic radiation curable (meth)acrylic composition for use in hardcoats for optical displays disclosed herein, the composition comprises from 1 to 50 wt. % of the one or more (meth)acrylate monomers containing an isocyanurate group based on the total weight of monomer solids; in some non-limiting embodiments from 2 to 40 wt. %; in some non-limiting embodiments from 3 to 30 wt. %; in some non-limiting embodiments from 10 to 30 wt. %; and in some non-limiting embodiments from 15 to 25 wt. %.

It should be noted that the molecular weight and the amount of the one or more multifunctional (meth)acrylate monomers as well as the one or more isocyanurate-containing (meth)acrylate monomers of the compositions disclosed herein are limited such that the viscosity of the composition remains workable in the conditions of the methods of making a coating in accordance with the present disclosure, and methods commonly practiced for large-scale coating operations such as gravure coating, slot-die coating etc.

In some non-limiting embodiments, the actinic radiation curable (meth)acrylate composition comprises one or more aliphatic urethane (meth)acrylate functional oligomers having from 6 to 24 (meth)acrylate groups; in some non-limiting embodiments two or more aliphatic urethane (meth)acrylate functional oligomers having from 6 to 24 (meth)acrylate groups; in some non-limiting embodiments three or more aliphatic urethane (meth)acrylate functional oligomers having from 6 to 24 (meth)acrylate groups; and; in some non-limiting embodiments four or more aliphatic urethane (meth)acrylate functional oligomers having from 6 to 24 (meth)acrylate groups.

A variety of the urethane (meth)acrylate functional oligomers may be used in the composition disclosed herein. In some non-limiting embodiments such oligomers can be an aliphatic version of the compound of formula I, below, wherein (meth)acrylate groups are located at the termini to give a total of from 6 to 24 (meth)acrylates, and in which R, R', and R" are independently chosen from linear or branched diols, triols, polyols, and can be same or different without special consideration to their sequence within the oligomer.

In some non-limiting embodiments, the aliphatic urethane (meth)acrylate functional oligomer comprises a urethane which is the reaction product of one or more of an aliphatic diisocyanate such as hexamethylene diisocyanate (HDI), isophorone diisocyanate (IPDI), 4,4'-diisocyanatodicyclohexylmethan (H12MDI), or an alicyclic triisocyanate, such as trimer isocyanurates, or aliphatic isocyanates composed of dimer uretdione structures, allophanate structures, biuret structures, 6-(imino)-1,3,5-oxadiazinane-2,4-dione structures, with linear or branched diols, triols, polyols, thiols, or primary or secondary amines. Further, in some non-limiting embodiments the aliphatic urethane (meth)acrylate functional oligomer comprises the reaction product of part or all isocyanate groups with a hydroxyalkyl (meth)acrylate.

In some non-limiting embodiments, the aliphatic urethane (meth)acrylate functional oligomer in accordance with the present invention contains no residual isocyanate or unreacted hydroxyalkyl groups in the hydroxyalkyl (meth)acrylate.

In some non-limiting embodiments, the aliphatic urethane (meth)acrylate functional oligomer in accordance with the present invention is derived from 1,3-bis(6-isocyanatohexyl)-5-(5-isocyanatopentyl)-1,3,5-triazinane-2,4,6-trione).

In some non-limiting embodiments of the actinic radiation curable (meth)acrylic composition disclosed herein, the one or more aliphatic urethane (meth)acrylate functional oligomers having from 6 to 24 (meth)acrylate groups has a formula molecular weight of from 500 to 10000; in some non-limiting embodiments from 750 to 7500; and in some non-limiting embodiments from 1000 to 5000.

In some non-limiting embodiments, the one or more aliphatic urethane (meth)acrylate functional oligomers having from 6 to 24 (meth)acrylate groups are selected from the group consisting of Ebecryl 1290, 1291, 5129, 8301-R, 8602, 8702, 220 (Allnex), Miramer PU622, MU9800, SC2152, U360, PU5000NT, PU610NT, PU620NT, PU662NT, PU6140NT (Miwon), UV-1700B, UV-6300B, UV-7600B, UV-7605B, UV-7610B, UV-7630B, UV-7640B, UV-7650B (Nippon Gohsei), Kayarad DPCA-20, Kayarad DPCA-30, Kayarad DPCA-60, Kayarad DPCA-120 (Nippon Kayaku).

In some non-limiting embodiments of the actinic radiation curable (meth)acrylic composition disclosed herein, the composition comprises from 5 to 50 wt. % of the one or more aliphatic urethane (meth)acrylate functional oligomers having from 6 to 24 (meth)acrylate groups based on the total weight of monomer solids; in some non-limiting embodiments from 5 to 45 wt. %; in some non-limiting embodiments from 10 to 45 wt. %; and in some non-limiting embodiments from 15 to 45 wt %.

In some non-limiting embodiments, the actinic radiation curable (meth)acrylate composition comprises one or more Si-containing (meth)acrylate monomers; in some non-limiting embodiments two or more Si-containing (meth)acrylate monomers; in some non-limiting embodiments three or more Si-containing (meth)acrylate monomers; and in some non-limiting embodiments four or more Si-containing (meth)acrylate monomers.

In some non-limiting embodiments, the one or more Si-containing (meth)acrylate monomers are selected from the group consisting of polyhedral oligomeric silsesquioxanes having one or more of the following idealized Formula 1, Formula 2, Formula 3, Formula 4 and Formula 5:

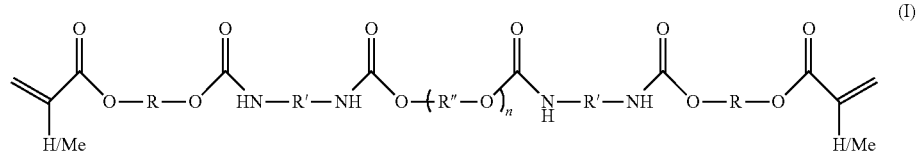
(I)

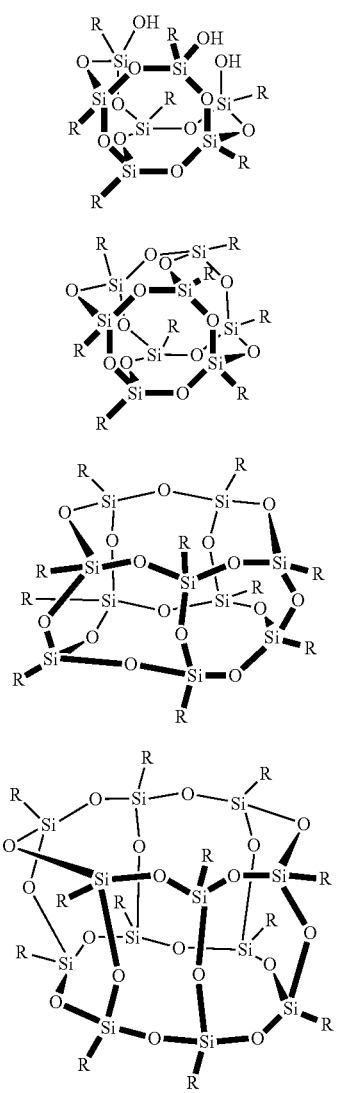

Formula 1

Formula 2

Formula 3

Formula 4 wherein R is the same or different at each occurrence and is selected from the group consisting of hydrogen, deuterium, a halogen, a cyano, a substituted or unsubstituted perfluoro ($C_1$-$C_{30}$)alkyl, a partially fluorinated or perfluorinated polyether, a polyether derived from ethylene oxide, propylene oxide, tetrahydrofurane or analogous heterocycles, a substituted or unsubstituted ($C_1$-$C_{30}$)alkyl, a substituted or unsubstituted deuterated ($C_1$-$C_{30}$)alkyl, a substituted or unsubstituted ($C_2$-$C_{30}$)alkenyl, a substituted or unsubstituted deuterated ($C_2$-$C_{30}$)alkenyl, a substituted or unsubstituted ($C_2$-$C_{30}$)alkynyl, a substituted or unsubstituted deuterated ($C_2$-$C_{30}$)alkynyl, a substituted or unsubstituted ($C_3$-$C_{30}$)cycloalkyl, a substituted or unsubstituted deuterated ($C_3$-$C_{30}$)cycloalkyl, a substituted or unsubstituted ($C_6$-$C_{60}$)aryl, a substituted or unsubstituted deuterated ($C_6$-$C_{60}$)aryl, a substituted or unsubstituted tri($C_1$-$C_{30}$)alkylsilyl, a substituted or unsubstituted deuterated tri($C_1$-$C_{30}$)alkylsilyl, a substituted or unsubstituted tri($C_6$-$C_{30}$)arylsilyl, a substituted or unsubstituted deuterated tri($C_6$-$C_{30}$)arylsilyl, a substituted or unsubstituted di($C_1$-$C_{30}$)alkyl($C_6$-$C_{30}$)arylsilyl, a substituted or unsubstituted deuterated di($C_1$-$C_{30}$)alkyl($C_6$-$C_{30}$)arylsilyl, a substituted or unsubstituted ($C_1$-$C_{30}$)alkyldi($C_6$-$C_{30}$)arylsilyl, a substituted or unsubstituted deuterated ($C_1$-$C_{30}$)alkyldi($C_6$-$C_{30}$)arylsilyl, a substituted or unsubstituted mono- or di-($C_6$-$C_{30}$)arylamino, or a substituted or unsubstituted deuterated mono- or di-($C_6$-$C_{30}$)arylamino; or may be linked to an adjacent substituent(s) to form a substituted or unsubstituted ($C_3$-$C_{30}$), mono- or polycyclic, alicyclic or aromatic ring that may or may not contain deuterium, and whose carbon atom(s) may be replaced with at least one hetero atom selected from N, O, and S.

In some non-limiting embodiments, R is the same or different at each occurrence and contains one or more (meth)acrylate groups and one or more (meth)acrylate groups reacted with a thiol-compound, an alcohol, an amine, a silicone, a phosphine, or a carbon-centered nucleophile comprising an (un)substituted ($C_6$-$C_{30}$)alkyl group. In some non-limiting embodiments the numerical majority or average of (meth)acrylate groups reacted with a thiol-compound comprising a ($C_6$-$C_{30}$)alkyl group in the Si-based (meth)acrylate monomer is in the range of 1 to n, wherein n represents the maximum number of vertices in a given polyhedral silsesquioxane structure. In some non-limiting embodiments, R is a functional group that is actinic radiation curable. In some non-limiting embodiments, R is a functional group that is not actinic radiation curable. In some non-limiting embodiments, R is a functional group that in the presence of sufficiently oxidizing conditions is readily degraded partially or in whole to yield volatile products.

In some non-limiting embodiments with two or more Si-containing (meth)acrylate monomers, at least one of the Si-containing (meth)acrylate monomers is UV-curable. In some non-limiting embodiments with two or more Si-containing (meth)acrylate monomers, at least one of the Si-containing (meth)acrylate monomers is not UV-curable.

In some non-limiting embodiments, the one or more Si-containing (meth)acrylate monomers is selected from the group consisting of polyhedral silsesquioxanes based on Formula 2 in which R is a vinyl-containing group, or a (meth)acrylate containing-group, or a (meth)acrylate containing-group that has been reacted with preferably a thiol-compound, or an alcohol, an amine, a silicone, a phosphine, or a carbon-centered nucleophile. More preferably, 30-70% of (meth)acrylate equivalents contained in a polyhedral silsesquioxane have been reacted on a molar basis, and the resulting polyhedral silsesquioxane is a statistical mixture of possible isomers.

In some non-limiting embodiments of the actinic radiation curable (meth)acrylic composition disclosed herein, the composition comprises from 0.1 to 50 wt. % of the one or more Si-containing (meth)acrylate monomers based on the total weight of the monomer solids; in some non-limiting embodiments from 0.2 to 40 wt. %; in some non-limiting embodiments from 0.25 to 20 wt. %; and in some non-limiting embodiments from 1 to 10 wt. %.

In some non-limiting embodiments, the actinic radiation curable (meth)acrylate composition comprises one or more UV radical initiators; in some non-limiting embodiments two or more UV radical initiators; in some non-limiting embodiments three or more UV radical initiators; and in some non-limiting embodiments four or more UV radical initiators.

In some non-limiting embodiments, the one or more UV radical initiators are selected from the group consisting of ketones, such as aryl alkyl ketones or aryl aryl ketone, in combination with synergists such as those derived from alkylated tertiary amines. Examples are benzyl ketals, hydroxyacetophenones, aminoacetophenones, phosphine oxides, benzophenones, benzyl formats, thioxanthones, azobisisobutyronitrile, benzoyl peroxide.

In some non-limiting embodiments, the one or more UV radical initiators are selected from the group consisting of benzophenones, benzils (1,2-diketones), (2-benzyl-2-dimethylamino-1-[4-(4-morpholinyl)phenyl]-1-butanone), 2,4,6-trimethyl-benzoyl)-diphenyl phosphine oxide, 1-hydroxy-cyclohexyl-pheny 1-ketone, 2-hydroxy-2-methyl-1-phenyl-1-propanone), oligomeric 2-hydroxy-2-methyl-1-[4-(1-methylvinyl)phenyl]propanones, dihydro-5-(2-hydroxy-2-methyl-1-oxopropyl)-1,1,3-trimethyl-3-(4-(2-hydroxy-2-methyl-1-oxopropyl)phenyl)-1H-indenes, and bis-benzophenones, or, preferably, oligomeric 2-hydroxy-2-methyl-1-[4-(1-methylvinyl)phenyl]propanones, dihydro-5-(2-hydroxy-2-methyl-1-oxopropyl)-1,1,3-trimethyl-3-(4-(2-hydroxy-2-methyl-1-oxopropyl)-phenyl)-1H-indenes, and α-[(4-benzoylphenoxy)-acetyl]-ω-[[2-(4-benzoylphenoxy)-acetyl]oxy]-poly(oxy-1,4-butanediyl)).

In some non-limiting embodiments of the actinic radiation curable (meth)acrylic composition disclosed herein, the composition comprises from 0.5 to 40 wt. % of the one or more UV radical initiators based on the total weight of the monomer solids; in some non-limiting embodiments from 1 to 25 wt. %; in some non-limiting embodiments from 2 to 10 wt. %; and in some non-limiting embodiments from 4 to 8 wt. %.

In some non-limiting embodiments, the actinic radiation curable (meth)acrylate composition comprises one or more monomers or additives capable of reducing the influence of atmospheric oxygen on the curing reaction of the hardcoat at its surface, and thus improving the degree of surface cure. Suitable compounds are chosen from hydrogen donors such as ethers, polyethers, amines, thiols, silanes, or other substances as mentioned in Chem. Rev. 2014, 114, 557-589. Suitable compounds further include phosphines, phosphites, and boranes.

In some non-limiting embodiments of the actinic radiation curable (meth)acrylic composition disclosed herein, the composition comprises from 0.25 to 25 wt. % of the one or more monomers or additives capable of reducing the influence of atmospheric oxygen on the curing reaction of the hardcoat at its surface based on the total weight of the monomer solids; in some non-limiting embodiments from 0.5 to 15 wt. %; in some non-limiting embodiments from 0.5 to 10 wt. %; and in some non-limiting embodiments from 0.5 to 5 wt. %.

In some non-limiting embodiments, the actinic radiation curable (meth)acrylate composition comprises one or more thiol-containing monomers to improve the degree of surface cure; in some non-limiting embodiments two or more thiol-containing monomers to improve the degree of surface cure; in some non-limiting embodiments three or more thiol-containing monomers; and in some non-limiting embodiments four or more thiol-containing monomers.

In some non-limiting embodiments, the one or more thiol-containing monomers are selected from the group consisting of aliphatic or aromatic thiols. In some non-limiting embodiments, the thiol-containing monomer comprises two or more thiol-functional groups derived from 3-mercaptopropanoic acid, 3-mercaptobutanoic acid, 2-mercaptoacetic acid or their respective isomers.

In some non-limiting embodiments, the one or more thiol-containing monomers are selected from the group consisting of propanoic acid, 3-mercapto-; propanoic acid, 3-mercapto-, 1,1'-(1,2-ethanediyl) ester; propanoic acid, 3-mercapto-, 1,1'-[2-ethyl-2-[(3-mercapto-1-oxopropoxy)methyl]-1,3-propanediyl]ester; propanoic acid, 3-mercapto-, octadecyl ester; propanoic acid, 3-mercapto-, 1,1'-[2-[[3-(3-mercapto-1-oxopropoxy)-2,2-bis[(3-mercapto-1-oxopropoxy)methyl]propoxy]-methyl]-2-[(3-mercapto-1-oxopropoxy)methyl]-1,3-propanediyl]ester; propanoic acid, 3-mercapto-, 1,1'-[2,2-bis[(3-mercapto-1-oxopropoxy)methyl]-1,3-propanediyl]ester; propanoic acid, 3-mercapto-, 1,1',1"'-[(2,4,6-trioxo-1,3,5-triazine-1,3,5(2H,4H,6H)-triyl)tri-2,1-ethanediyl]ester; propanoic acid, 3-mercapto-, 1,1'-[2-[(3-mercapto-1-oxopropoxy)methyl]-2-methyl-1,3-propanediyl]ester; propanoic acid, 3-mercapto-, 1,1'-[oxybis(2,1-ethanediyloxy-2,1-ethanediyl)]ester; propanoic acid, 3-mercapto-, 1,1'-(1,4-butanediyl) ester; butanedioic acid, 2-mercapto-, 1,4-bis(3-methylbutyl) ester; pentanoic acid, 3-mercapto-; cysteine, N-(1-oxooctyl)-; butanoic acid, 3-mercapto-, 1,1'-[2,2-bis[(3-mercapto-1-oxobutoxy)methyl]-1,3-propanediyl]ester; butanedioic acid, 2-mercapto-, 1,4-bis(2-mercaptoethyl) ester; hexanoic acid, 3,6-dimercapto-; butanoic acid, 3-mercapto-, 1,1'-[2-ethyl-2-[(3-mercapto-1-oxobutoxy)methyl]-1,3-propanediyl]ester; pentanoic acid, 3-mercapto-, ethyl ester; 1,2,3-propanetricarboxylic acid, 2-mercapto-, 1,2,3-trimethyl ester; acetic acid, 2-mercapto-, 3-methoxybutyl ester; acetic acid, 2-mercapto-, 1,1'-[2-ethyl-2-[[(2-mercaptoacetyl) oxy]methyl]-1,3-propanediyl]ester; pentanoic acid, 3-mercapto-, 1,1'-(1,2-ethanediyl) ester; acetic acid, 2-mercapto-, 2-ethylhexyl ester; acetic acid, 2-mercapto-, 1,1'-(1,2-ethanediyl) ester; acetic acid, 2-mercapto-, 1,1'-(1,4-butanediyl) ester; acetic acid, 2-mercapto-, 1,1'-[2,2-bis[[(2-mercaptoacetyl)oxy]methyl]-1,3-propanediyl]ester; acetic acid, 2-mercapto-, octyl ester; acetic acid, 2-mercapto-, 2-methoxyethyl ester; acetic acid, 2-mercapto-, 2-(2-methoxyethoxy)ethyl ester; acetic acid, 2-mercapto-, 1,1',1"-(1,2,3-propanetriyl) ester; acetic acid, 2-mercapto-, ester with 1,2,6-hexanetriol (3:1); acetic acid, 2-mercapto-, 1,1'-(2-hydroxy-1,3-propanediyl) ester; acetic acid, 2-mercapto-, 1,1'-[2-[[(2-mercaptoacetyl)oxy]methyl]-2-methyl-1,3-propanediyl]ester; acetic acid, mercapto-, 2,2-dimethyl-1,3-propanediyl ester (9CI)acetic acid, mercapto-, (1-methylethylidene)di-4,1-cyclohexanediyl ester (9CI); acetic acid, mercapto-, 2,2-dimethyl-1-(1-methylethyl)-1,3-propanediyl ester (9CI); propanoic acid, 2-mercapto-, 1,1'-[(2,4,6-trioxo-1,3,5-triazine-1,3,5 (2H,4H,6H)-triyl)tri-2,1-ethanediyl]ester; and homo- and copolymers containing (mercaptopropyl)methylsiloxane.

In some non-limiting embodiments of the actinic radiation curable (meth)acrylic composition disclosed herein, the composition comprises from 0.25 to 25 wt. % of the one or more thiol-containing monomers based on the total weight of the monomer solids; in some non-limiting embodiments from 0.5 to 15 wt. %; in some non-limiting embodiments from 0.5 to 10 wt. %; and in some non-limiting embodiments from 0.5 to 5 wt. %.

In some non-limiting embodiments, the actinic radiation curable (meth)acrylate composition disclosed herein comprises one or more types of nanoparticles, preferably in an amount of 0.05-2.5 wt %, or more preferably 0.1-1 wt %.

In one non-limiting embodiment, nanoparticles as useful in formulations disclosed herein are generally commercially available. They can be obtained in a variety of average particle diameters, surface treatments, and solvent systems or reactive diluents.

In one non-limiting embodiment of the curable resin composition, the nanoparticles are silica; in another non-limiting embodiment zirconium oxide, or aluminum oxide; in another non-limiting embodiment a mixture of silica and zirconium oxide. In one non-limiting embodiment, the nanoparticles are approximately spherical in shape, but non-spherical shapes are possible, e.g. rod-shapes or ellipses. In one non-limiting embodiment, the nanoparticles are described based on their production method as fused or fumed instead of colloidal. In one non-limiting embodiment the surface of the nanoparticles is functionalized with substituent groups. These substituent groups can comprise functional groups (e.g., epoxy, acrylate, amino, vinyl ether, etc.) that can chemically react with functional groups contained in the resin composition under conditions of actinic radiation or thermal cure but can also comprise functional groups that are chemically inert under such conditions (e.g. alkyl, aryl, halogen etc.). In one non-limiting embodiment, a mixture of chemically reactive and chemically inert substituents is present on the surface of a given nanoparticle.

In one non-limiting embodiment of the curable resin composition, the nanoparticles comprise a mixture of two or more different types of nanoparticles; in another non-limiting embodiment, the two or more different types of nanoparticles have diameters that differ from one another by 10% or less; in another non-liming embodiment; 5% or less; in another non-limiting embodiment, 1% or less. The two or more different types of nanoparticles in such compositions can be referred to by the term "having similar diameters." In one non-limiting embodiment, the two or more different types of nanoparticles are functionalized with the same functional groups. In one non-limiting embodiment, the two or more different types of nanoparticles are functionalized with different functional groups.

In one non-limiting embodiment, a mixture of nanoparticles can be used wherein the nanoparticles have similar average diameters in size but differ in the amount and chemical nature of substituents present on the surface of the particle. Additionally, the mixture can comprise nanoparticles which bear only substituents that are chemically inert under conditions of actinic radiation or thermal curing condition, and nanoparticles that bear only substituents that are chemically reactive under conditions of actinic radiation or thermal curing condition.

In one non-limiting embodiment, the nanoparticles may have an average diameter of 10-500 nm as determined by transmission electron microscopy, preferably 10-100 nm, more preferably 20-60 nm. In another non-limiting embodiment, two or more nanoparticles of a given average diameter may have agglomerated to form an agglomerate. In another non-limiting embodiment, the average size of these agglomerates is less than 500 nm as determined by transmission electron microscopy. In another non-limiting embodiment, a treatment such as ultra-sonication may be applied to break up agglomerates of the nanoparticles.

It will be appreciated that a mixture of nanoparticles may be used in the present curable resin compositions. One example of a mixture of nanoparticles is a mixture of two or more different kinds of nanoparticles such as a mixture of silica and zirconium oxide nanoparticles. Such mixture of nanoparticles may be a mixture of two or more different nanoparticles having the same or similar average diameter, such as a mixture of 20-nm silica and 20-nm zirconium oxide or may be a mixture of two or more different nanoparticles having different average diameters, such as a mixture of 10-nm silica and 50-nm zirconium oxide. Another example of a mixture of nanoparticles is a mixture of two or more of the same nanoparticles but having different average diameters such as a mixture of first silica nanoparticles having an average diameter of 10-nm and second silica nanoparticles having an average diameter of 50-nm.

In one non-limiting embodiment, the nanoparticles may have been treated with a dispersing agent or surfactant, or other agent that improves the dispersion of the particles in a resin composition. Preferred dispersing agents are based on phosphor-containing molecules such as phosphates, phosphonates, phosphinates, and phosphites, their respective salts, acids, and organic esters.

Any of the above embodiments of the nanoparticles can be combined with one or more of the other embodiments, so long as they are not mutually exclusive. For example, the embodiment in the nanoparticles are silica can be combined with the embodiment in which the nanoparticles are functionalized. The skilled person would understand which embodiments were mutually exclusive and would thus readily be able to determine the combinations of embodiments that are contemplated by the present application.

In some non-limiting embodiments, the actinic radiation curable (meth)acrylate composition comprises one or more organic solvents; in some non-limiting embodiments two or more organic solvents; in some non-limiting embodiments three or more organic solvents; and in some non-limiting embodiments four or more organic solvents.

In some non-limiting embodiments, the one or more organic solvents are selected from the group consisting of ketones, ethers, aliphatic hydrocarbons, aromatic hydrocarbon; aromatic alcohols, alkanols, lactones, amides, esters, phenolic ethers, and combinations thereof. Solvents may include a combination of multiple functional groups on one chain, for example a benzene ring containing an ether and a hydroxyl functional group, or an aliphatic ether also containing an additional alcohol group.

In some non-limiting embodiments, the one or more organic solvents are selected from the group consisting of dimethylacetamide, N-methylpyrrolidone, propylene glycol methyl ether acetate, methyl isobutyl ketone, 2-pentanone, 2-hydroxyisobutyric acid methyl ester ("HBM"), propylene glycol monomethyl ether ("PGME"), ethyl lactate, methyl, cyclopentanol, gamma-butyrolactone, Dipropylene Glycol Methyl Ether Acetate, ethyl 3-ethoxypropionate ("EEP"), 1,2-dimethoxybenzene, benzyl propionate, n-butyl benzoate and other solvents.

In some non-limiting embodiments of the actinic radiation curable (meth)acrylic composition disclosed herein, the composition comprises from 1 to 99 wt. % of the one or more organic solvents based on the total weight of the composition; in some non-limiting embodiments from 5 to 95 wt. %; in some non-limiting embodiments from 10 to 90 wt. %; and in some non-limiting embodiments from 25 to 75 wt. %.

In some non-limiting embodiments of the actinic radiation curable (meth)acrylic composition disclosed herein, the composition comprises a primary solvent (i.e. constituting 51-100 wt % in a blend of formulation solvents), and secondary solvents (i.e. constituting 0-49 wt % in a blend of formulation solvents). Preferred primary solvents are propylene glycol methyl ether acetate (PGMEA), 2-hydroxyisobutyric acid methyl ester (HBM), Propylene glycol monomethyl ether (PGME), ethyl lactate, methyl isobutylketone, 2-pentanone, cylcopentanol. Preferred secondary solvents are gamma-butyrolactone, ethyl 3-ethoxypropionate (EEP), 1,2-dimethoxybenzene, benzyl propionate, n-butyl benzoate.

In some non-limiting embodiments, the actinic radiation curable (meth)acrylate composition disclosed herein optionally comprises one or more additives. In some non-limiting embodiments, the additives are selected from the group consisting of fluorinated additives and silicone-containing additives such as mold-release agents, slip agents, anti-fingerprint agents, anti-oxidants, anti-hydrolysis agents, and the like and combinations thereof. In some non-limiting embodiments of the actinic radiation curable (meth)acrylic composition disclosed herein, the composition comprises from 0.01 to 10 wt. % of the one or more additives based on the total weight of the monomer solids; in some non-limiting embodiments from 0.05 to 5 wt. %; and in some non-limiting embodiments from 0.1 to 2 wt. %.

In some non-limiting embodiments, the anti-oxidants are selected from the group consisting of phenols-, phosphites-, phosphates-, thioesters-, aminics-, aminoxyl radicals-, functional groups, or other chemical components as described, for example, in U.S. Pat. No. 8,921,441B2 and in Progress in Organic Coatings 77 (2014) 1789-1798.

In some non-limiting embodiments, the anti-hydrolysis agents are selected from the group consisting of molecules based on acetal-, vinyl-ether-, vinly-ester-, anhydride-, or carbodiimide-functional groups. Non-limiting examples of such anti-hydrolysis agents include bis(2,6-diisopropylphenyl)carbodiimide), Bruggolen H3337 (Brüggemann), Eustab HS-700 (Eutec Chemical), Stabaxol® 1 LF (Lanxess), Stabaxol® KE 9193 (Lanxess), Stabaxol® P (Lanxess), Stabaxol® P200 (Lanxess), Stabaxol® P100 (Lanxess), Stabaxol® P110 (Lanxess), Stabilizer 7000 (Raschig), Stabilizer 9000 (Raschig).

Any of the above embodiments for the actinic radiation curable (meth)acrylate composition disclosed herein can be combined with one or more of the other embodiments, so long as they are not mutually exclusive. For example, the embodiment in which the composition comprises from 5 to 50 wt. % of the one or more aliphatic urethane (meth) acrylate functional oligomers having from 6 to 24 (meth) acrylate groups can be combined with the embodiment in which the composition comprises an anti-fingerprint agent. The skilled person would understand which embodiments were mutually exclusive and would thus readily be able to determine the combinations of embodiments that are contemplated by the present application.

The present invention further provides a method of making a hardcoat article from an actinic radiation curable (meth)acrylate composition comprising: (a) one or more multifunctional (meth)acrylate monomers; (b) optionally one or more (meth)acrylate monomers containing an isocyanurate group: (c) optionally one or more aliphatic urethane (meth)acrylate functional oligomers having from 6 to 24 (meth)acrylate groups; (d) one or more Si-containing (meth)acrylate monomers; (e) one or more UV radical initiators; (f) one or more monomers to improve surface cure; (g) nanoparticles; and (h) one or more organic solvents; wherein the method comprises applying the compositions to a mold or a substrate to form a film or coating, optionally removing organic solvent such as by heating to a temperature of 50 to 200° C., curing the film or coating with actinic radiation, exposing the film or coating to an oxidizing environment, applying an additional layer of a highly-fluorinated compound to the film or coating (preferably comprising silicone-reactive groups), and thermally curing the film at a temperature of 80 to 200° C., wherein the relative humidity is preferably 50% or greater if the curing temperature is <100° C.

For the method of making a hardcoat article, embodiments associated with the actinic radiation curable (meth) acrylate composition comprising: (a) one or more multifunctional (meth)acrylate monomers; (b) optionally one or more (meth)acrylate monomers containing an isocyanurate group: (c) optionally one or more aliphatic urethane (meth)acrylate functional oligomers having from 6 to 24 (meth)acrylate groups; (d) one or more Si-containing (meth)acrylate monomers; (e) one or more UV radical initiators; (f) one or more thiol-containing monomers; and (g) one or more organic solvents are identical to those described herein in the context of the composition itself.

In some non-limiting embodiments of the method of making a hardcoat article from an actinic radiation curable (meth)acrylate composition disclosed herein, any suitable means of applying the composition to a mold or substrate to form a film or coating may be employed. These include, but are not limited to, drawdown bar coating, wire bar coating, slit coating, flexographic printing, imprinting, spray coating, dip coating, spin coating, flood coating, screen printing, inkjet printing, gravure coating, slot die coating, and the like and combinations thereof. Any suitable substrate may be used in the present method, and preferably such substrates are any which are used in flexible displays. Suitable substrates include, without limitation, polyesters, such as poly (ethylene terephthalate) (PET), polyimides, polyamides, polycarbonates, poly(methyl methacrylate), poly(cyclic olefins), poly(vinyl fluoride), glass, and the like. Other appropriate substrates would be generally known to one having skill in the art. The application of the composition to a mold or substrate is generally carried out at a suitable temperature given the composition and the mold or substrate being employed. In some non-limiting embodiments, the composition is applied at a temperature from 20° C. to 150° C.; in some non-limiting embodiments from 30° C. to 150° C.; in some non-limiting embodiments from 40° C. to 150° C.; and in some non-limiting embodiments from 50° C. to 150° C.

Following application of the composition to the mold or substrate, organic solvents may optionally be removed from the coating. In some non-limiting embodiments, this drying step may be performed at temperatures between 20° C. and 250° C.; in some non-limiting embodiments between 50° C. and 200° C.; in some non-limiting embodiments between 75° C. and 150° C.; and in some non-limiting embodiments between 80° C. and 120° C. The appropriate duration of the drying step can generally be assessed by one having skill in the art depending on the nature of the coating, the thickness of the coating, and other factors as appropriate. In some non-limiting embodiments, this drying step is performed for approximately 30 s; in some non-limiting embodiments approximately 60 s; in some non-limiting embodiments approximately 90 s; in some non-limiting embodiments approximately 120 s; and in some non-limiting embodiments for a duration exceeding 120 s.

Any suitable actinic radiation may be used to cure coatings of the present compositions. Exemplary actinic radiation is any radiation having a wavelength in range of from 100 to 780 nm, and in some non-limiting embodiments actinic radiation having a peak maximum in the range of from 100 to 400 nm, such as UV. In some non-limiting embodiments; actinic radiation is provided by high pressure UV lamps, medium pressure UV lamps, fusion UV lamps, and LED lamps. In some non-limiting embodiments; the films of formed from the present compositions are cured by exposure to a UV dosage of 480, 120, 35, and 570 mJ/cm$^2$ in the UVA, UVB, UVC, and UVV regimes, respectively, with a Fusion Systems UV belt system device (Heraeus Noblelight American, LLC, Gaithersburg, Md.), which is equipped with D lamp at a speed of 0.24 m/s.

Following the cure step, the cured coating or film is exposed to an oxidizing environment whereby an oxide layer is preferentially developed at the coating surface. This can be achieved via exposure of the cured film or coating to an oxygen plasma atmosphere, ozone, exposure to short wavelength ultraviolet light (for example as described in U.S. Pat. No. 8,163,357), electron beam radiation or similar means. The time of exposure if preferentially 300 s or less.

In a non-limiting embodiment, the exposure to an oxidizing environment leads to an increase in relative oxygen content within the first 100 nm depth of the coating (relative to a total hardcoat thickness of 5 μm) as viewed from the air-side of the coating and as determined by X-ray photoelectron spectroscopy (XPS). In another non limiting embodiment, the exposure to an oxidizing environment leads to an increase in relative surface roughness as determined by transmission electron microscopy (TEM) or atomic force microscopy (AFM). In another non-limiting embodiment, the atomic composition within the first 100 nm depth of the coating (relative to a total hardcoat thickness of 5 μm) as viewed from the air-side of the coating and as determined by X-ray photoelectron spectroscopy (XPS) has a silicon- and oxygen-enriched composition relative to the silicon- and oxygen-content initially contained in the mixture of the non-volatile, uncured components of the hardcoat composition, and a corresponding carbon-depleted composition.

Following the surface oxidation step, one or more additional layers of highly-fluorinated compounds are applied to the film or coating as prepared above. Non-limiting examples of such compounds include highly-fluorinated compounds comprising silicone-reacting groups, or non-fluorinated compounds comprising silicone-reacting groups and aliphatic or aromatic hydrocarbons. In some non-limiting embodiments, highly-fluorinated silane compounds are selected from the group consisting of silanes based on perfluoropolyether: Shin-Etsu Subelyn® KY-1900 series such as KY-1901, and KY-100 series such as KY-108 (Shin Etsu), Optool DSX, Optool UD120, Optool UD509 (Daikin Industries, Ltd.); silanes based on perfluoroalkane: silane, triethoxy(3,3,4,4,5,5,6,6,7,7,8,8,9,9,10,10,10-heptadecafluorodecyl)-; silane, triethoxy(3,3,4,4,5,5,6,6,7,7,8,8,8-tridecafluorooctyl)-; silane, (3,3,4,4,5,5,6,6,7,7,8,8,9,9,10,10,10-heptadecafluorodecyl) trimethoxy-; silane, trimethoxy(3,3,4,4,5,5,6,6,7,7,8,8,8-tridecafluorooctyl)-; silane, trichloro(3,3,4,4,5,5,6,6,7,7,8,8,8-tridecafluorooctyl)-; silane, trichloro(3,3,4,4,5,5,6,6,7,7,8,8,9,9,10,10,10-heptadecafluorodecyl)-; silane, trimethoxy (3,3,4,4,5,5,6,6,6-nonafluorohexyl)-; and silane, triethoxy(3,3,4,4,5,5,6,6,6-nonafluorohexyl)-.

In some non-limiting embodiments, the highly-fluorinated silane compounds to be applied is first diluted with an appropriate volatile solvent, such as a fluorinated polyether or fluorinated hydrocarbon.

Following the application of the one or more additional layers of highly-fluorinated compounds, the as-coated coating or film is subjected to a thermal curing step. In some non-limiting embodiments the thermal curing is carried out at 20-200° C., preferably for 1 hour or less. In other non-limiting embodiments the thermal curing is carried out at levels of relative humidity ranging from 50-95%. In other non-limiting embodiments, a heat-stabilized substrate is used. In other non-limiting embodiments, the curing is carried out in an atmosphere free of oxygen. Individual elements of these curing conditions can be combined so long as they are not mutually exclusive, e.g. curing at 60° C. and 90% relative humidity for 1 hour.

Following the application and cure of the one or more additional layers of highly-fluorinated compounds, the atomic composition within the first 100 nm depth of the coating (relative to a total hardcoat thickness of 5 μm) as viewed from the air-side of the coating and as determined by X-ray photoelectron spectroscopy (XPS) shows at first a relative majority of fluorine, followed by a layer that is predominantly rich in oxygen, then carbon, then silicon or fluorine, then fluorine or silicone (in that order). At depths much greater than 100 nm the atomic composition is predominantly rich in carbon, oxygen, nitrogen, and is almost deplete of silicon and fluorine.

Any of the above embodiments for the method of making a hardcoat article from an actinic radiation curable (meth) acrylate composition disclosed herein can be combined with one or more of the other embodiments, so long as they are not mutually exclusive. For example, the embodiment in which the drying step is performed at a temperature between 50° C. and 200° C. can be combined with the embodiment in which the highly-fluorinated silane compounds are selected from the group consisting of silanes based on perfluoro polyethers. The skilled person would understand which embodiments were mutually exclusive and would thus readily be able to determine the combinations of embodiments that are contemplated by the present application.

The present invention further provides a coated hardcoat article prepared as disclosed herein. For the coated hardcoat article, embodiments associated with the actinic radiation curable (meth)acrylate composition and the method for making the hardcoat article are identical to those described herein above.

Properties associated with the coated hardcoat articles disclosed herein are generally useful in optical-display applications. A number of such properties can be assessed via measurement methods generally known to those having skill in the art.

The thickness of the silane surface layer on the hardcoat articles disclosed herein can generally be measured by TEM or XPS. In some non-limiting embodiments of the hardcoat articles disclosed herein, the thickness of the silane surface layer is between 1 and 200 nm; in some non-limiting embodiments between 2 and 150 nm; in some non-limiting embodiments between 3 and 100 nm; in some non-limiting embodiments between 3 and 90 nm; and in some non-limiting embodiments between 5 and 50 nm.

The static water contact angle associated with the surface layer on the hardcoat articles disclosed herein can generally be measured by the sessile drop technique. In some non-limiting embodiments of the hardcoat articles disclosed herein, the water contact angle associated with the silane surface layer on the hardcoat articles disclosed herein is equal to or greater than 110°; in some non-limiting embodiments equal to or greater than 111°; in some non-limiting embodiments equal to or greater than 112°; in some non-limiting embodiments equal to or greater than 113°; in some non-limiting embodiments equal to or greater than 114°; in some non-limiting embodiments equal to or greater than 115°; in some non-limiting embodiments equal to or greater than 116°; in some non-limiting embodiments equal to or greater than 117°; in some non-limiting embodiments equal to or greater than 118°; in some non-limiting embodiments equal to or greater than 119°; in some non-limiting embodiments equal to or greater than 120°; in some non-limiting embodiments equal to or greater than 121°; in some non-limiting embodiments equal to or greater than 122°; in some non-limiting embodiments equal to or greater than 123°; in some non-limiting embodiments equal to or greater than 124°; and in some non-limiting embodiments equal to or greater than 125°.

The haze associated with the surface layer on the hardcoat articles disclosed herein can generally be measured following ASTM D1003 using for example a Haze-Gard Plus instrument, model 4725, by BYK-Gardner. The transmission of the hardcoat articles can be similarly measured. In some non-limiting embodiments of the hardcoat articles disclosed herein, the haze associated with the silane surface layer on the hardcoat articles disclosed herein is less than 5%; in some embodiments less than 4%; in some embodiments less than 3%; in some embodiments less than 2%; in some embodiments less than 1%; and in some embodiments less than 0.5%.

Any of the above embodiments of the coated hardcoat article disclosed herein can be combined with one or more of the other embodiments, so long as they are not mutually exclusive. For example, the embodiment in which the coated hardcoat article has a silane surface layer with thickness between 5 and 90 nm can be combined with the embodiment wherein the coated hardcoat article exhibits a water contact angle greater than 1250 and the embodiment wherein the haze associated with the silane surface layer on the hardcoat article is less than 1%. The skilled person would understand which embodiments were mutually exclusive and would thus readily be able to determine the combinations of embodiments that are contemplated by the present application.

The scratch resistance associated with the surface layer on the hardcoat articles disclosed herein can generally be assessed by any number of methods known to those with skill in the art. In one non-limiting embodiment, a Taber Reciprocating Abrader #5900 may be employed. A piece of hardcoat-coated substrate is flattened onto a glass panel and adhered to the glass panel using 3M Magic™ tape. A piece of steel wool (2×2 cm, #0000 from Bonstar, preconditioned by sliding over PET Melinex® 462 for 50 cycles at 1 kgf, 40 cycles/min, scratch length 4 cm) is placed onto the hardcoat, and slid over the hardcoat for up to 10,000 cycles using 1 kgf, 40 cycles/min, and a scratch length 4 cm. Lastly, the static water-contact angle of the hardcoat surface is determined at both an abraded and a non-abraded area on the hardcoat. Similar WCAs in the two areas are a reflection of good scratch resistance. Conversely, reduction of WCAs after abrasion indicates that the surface layer is relatively-less resistant to abrasion. Static water-contact angles are measured on a Kruss DSA 100 at 23° C. using the sessile drop technique. The volume of the drop placed on the coating is 2 µL, dispensed at 1100 microliter/min. Reported values are an average of multiple individual drops placed along the middle ⅓ of the abraded area or other determined areas of interest, and a linear baseline is assumed. Other properties disclosed herein can also be assessed before and after abrasion via this, and related, methods. For example, a surface layer with high scratch resistance will generally also be free of visible streaks or defects after exposure to these abrasion conditions.

For characterization of the final hardcoat articles using transmission electron microscopy (TEM), the samples may be cut into small coupons and embedded in Buehler Epoxicure 2 epoxy, then cross-sectioned using a microtome operating at 0.4 mm/s with step size 99 nm and equipped with a 35-degree cryo-wet diamond knife. Cross-sections may either be prepared at room temperature and floated onto water, or prepared at −90° C. into ethanol and then poured into water. The sections can then be lifted onto a 200-mesh thin-bar copper TEM grid with carbon support film and residual water wicked away using filter paper and then dried under ambient conditions. TEM images may be acquired using a JEOL JEM 2200FS TEM operating at 200-kV accelerating voltage with condenser aperture 2, objective aperture 3, high-contrast aperture 2, and 20 eV energy filter slit, and equipped with a Gatan OneView camera.

For characterization of the surface chemical composition of hardcoat articles using X-ray photoelectron spectroscopy (XPS), analyses may be performed at a 450 exit angle (sampling depth of ~7 nm) with an Al Kα anode monochromatic X-ray source using a Physical Electronics Versaprobe II instrument. Depth profiles may be performed using Ar gas cluster ion beam under the condition of 10 kV20 nA with a 3 mm×3 mm sputter crater. The analytical area may be at 200×200 µm².

In some non-limiting embodiments of the hardcoat articles disclosed herein, the water contact angle associated with the silane surface layer on the hardcoat articles disclosed herein is greater than 1000 after exposure to 7000 cycles of scratch resistance testing using a commercial abrader device; in some non-limiting embodiments greater than 101°; in some non-limiting embodiments greater than 102°; in some non-limiting embodiments greater than 103°; in some non-limiting embodiments greater than 104°; in some non-limiting embodiments greater than 105°; in some non-limiting embodiments greater than 106°; in some non-limiting embodiments greater than 107°; in some non-limiting embodiments greater than 108°; in some non-limiting embodiments greater than 109°; and in some non-limiting embodiments greater than 110°. In some non-limiting embodiments of the hardcoat articles disclosed herein, the coating is free of visible streaks or defects after exposure to 3000 cycles of scratch resistance testing using a commercial abrader device.

The present invention further provides a display device comprising a coated hardcoat article as disclosed herein. In some non-limiting embodiments, the display device is selected from the group consisting of OLED, AMOLED, PMOLED, flexible OLED, rollable OLED, and foldable OLED.

Although methods and materials similar or equivalent to those described herein can be used in the practice or testing of the present invention, suitable methods and materials are described below. In addition, the materials, methods, and examples are illustrative only and not intended to be limiting. All publications, patent applications, patents, and other references mentioned herein are incorporated by reference in their entirety.

EXAMPLES

The concepts described herein will be further illustrated in the following examples, which do not limit the scope of the invention described in the claims.

Examples 1-4: Synthesis of Si-Containing Acrylate Monomers M1-4

General procedure for the synthesis of Si-containing acrylate monomers M1, M2, M3, M4: Si-containing acrylate monomers M1-4 were synthesized by mixing POSS® MA0736 (Hybrid Plastics, CAS 1620202-27-8, structure shown as in Scheme 1 below) and 1-methoxy-2-propanol ("PGME", CAS 107-98-2) in a glass container containing a Teflon™ stir bar for 15 minutes to give a homogeneous mixture. 1-Dodecanethiol (CAS 112-55-0) was added, and the resulting mixture stirred at 20° C. for 5 minutes to give a homogeneous mixture. 1,8-Diazabicyclo[5.4.0]-undec-7-ene ("DBU", CAS 6674-22-2) was added to the mixture, the container sealed, and stirring continued at 20° C. and 300 rpm for 3 hours. Afterwards, acetic acid (CAS 64-19-7) was added to the reaction mixture and stirred for 10 minutes. The pH value of the reaction mixture was then verified to be below 7. The reaction mixture was subsequently filtered through a plug of silica-alumina powder (silica-alumina catalyst support, grade 135, CAS 1335-30-4), a 5-μm Nylon filter, and a 1-μm PTFE-syringe filter to give the final product, the identity of which was confirmed using $^1$H-NMR spectroscopy.

The relative quantities of the raw materials used in the synthesis of Si-containing acrylate monomers M1-4 in Scheme 1 are reported in Table 1.

Scheme 1. Synthesis of monomers M1 (X = 3), M2 (X = 4), M3 (X = 5), and M4 (X = 6)

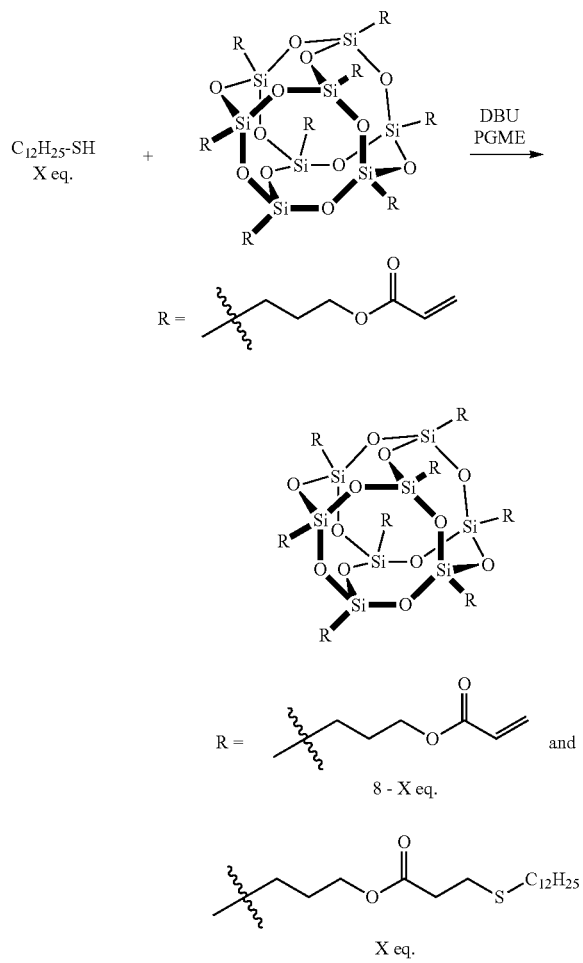

In the Examples below, the following materials were used:

SR399 (Sartomer): A mixture of tetra-, penta-, and hexa-acrylate esters of dipentaerythritol. 10-25 wt % of the solids in final formulation.

Photomer® 4356 (Tris (2-hydroxyethyl)isocyanurate triacrylate) 18-25 wt % of the solids in final formulation.

Omnirad 184 (1-hydroxycyclohexylphenyl ketone) or KTO 46 (mixture of diphenyl(2,4,6-trimethylbenzoyl)phosphine oxide, 2-hydroxy-2-methylpropiophenone, 2,3-dihydro-6-(2-hydroxy-2-methyl-1-oxopropyl)-1,1,3-trimethyl-3-[4-(2-hydroxy-2-methyl-1-oxopropyl)phenyl]-1H-indene, 2,3-dihydro-5-(2-hydroxy-2-methyl-1-oxopropyl)-1,1,3-trimethyl-3-[4-(2-hydroxy-2-methyl-1-oxopropyl) phenyl]-1H-indene, 2,4,6-trimethylbenzophenone, 2-methylbenzophenone). 1-10 wt % of the solids in final formulation.

Ebecryl™ LED02: A mixture of tri-acrylate esters of ethoxylated trimethylolpropane and pentaerythritol tetrakis (3-mercaptopropionate). 1-20 wt % of the solids in final formulation.

Nanobyk 3601 (BYK): Alumina nanoparticles suspended in 1-methyl-1,2-ethanediyl)bis[oxy(methyl-2,1-ethanediyl)] diacrylate. 0.1-2 wt % of the solids in final formulation.

Si-containing compound: POSS® MA0736 or OL1170 (Hybrid Plastics), or monomer M1-4. 0.1-2 wt % of the solids in final formulation.

Ebecryl™ 8602: A mixture of tri- and tetra-acrylate esters of pentaerythritol, hexa-acrylate ester of dipentaerythritol, and reaction product of tri acrylate ester of pentaerythritol with 1,3-bis(6-isocyanatohexyl)-5-(5-isocyanatopentyl)-1,3,5-triazinane-2,4,6-trione). 30-55 wt % of the solids in final formulation.

Solvent: Propylene glycol methyl ether acetate (PGMEA) as primary solvent (i.e. constituting 51-100 wt % in a blend of formulation solvents), and ethyl 3-ethoxypropionate as a secondary solvent (i.e. constituting 0-49 wt % in a blend of formulation solvents). 40-99 wt % of the total formulation.

Optool DAC-HP (Daikin Industries, Ltd.)—for comparative example only: Fluoropolymer comprising acrylated perfluorinated polyether with alcohol-end groups, in 1-methoxy-2-propanol and 1,1,2,2,3,3,4-heptafluorocyclopentane).

KY-1901 (Shin Etsu Silicones of America Inc.)—perfluoropolyether silane compound (20 wt %) in solvent Novec 7200 (3M).

Anti-oxidants: Additives based on phenol-, phosphite-, phosphate-, thioester-, aminic-, aminoxyl radical-, functional groups, or other chemical components as described in U.S. Pat. No. 8,921,441B2 or in Progress in Organic Coatings 77 (2014) 1789-1798. 0-2 wt % of the solids in final formulation.

TABLE 1

| Chemical | Example 1: Monomer M1 (X = 3) | | Example 2: Monomer M2 (X = 4) | | Example 3: Monomer M3 (X = 5) | | Example 4: Monomer M4 (X = 6) | |
| --- | --- | --- | --- | --- | --- | --- | --- | --- |
| | Mass (g) | Moles | Mass (g) | Moles | Mass (g) | Moles | Mass (g) | Moles |
| MA0736 | 120.29 | 0.091 | 120.29 | 0.091 | 120.29 | 0.091 | 120.29 | 0.091 |
| 1-dodecanethiol | 55.26 | 0.273 | 73.67 | 0.364 | 92.09 | 0.455 | 110.51 | 0.546 |
| PGME | 803.92 | — | 803.92 | — | 803.92 | — | 803.92 | — |
| DBU | 1.52 | $9.96 \times 10^{-3}$ | 1.52 | $9.96 \times 10^{-3}$ | 1.52 | $9.96 \times 10^{-3}$ | 1.52 | $9.96 \times 10^{-3}$ |
| Acetic Acid | 0.66 | 0.011 | 0.66 | 0.011 | 0.66 | 0.011 | 0.66 | 0.011 |

Anti-hydrolysis additives: Molecules based on acetal-, vinyl-ether-, vinly-ester-, anhydride-, or carbodiimide-functional groups. Examples of anti-hydrolysis additives include bis(2,6-diisopropylphenyl)carbodiimide, Bruggolen H3337 (Bruggemann), Eustab HS-700 (Eutec Chemical), Stabaxol® 1 LF (Lanxess), Stabaxol® KE 9193 (Lanxess), Stabaxol® P (Lanxess), Stabaxol® P200 (Lanxess), Stabaxol® P100 (Lanxess), Stabaxol® P110 (Lanxess), Stabilizer 7000 (Raschig), Stabilizer 9000 (Raschig). 0-2 wt % of the solids in final formulation.

Example 5: Formulation A-1: Formulation A-1 was prepared by combining Ebecryl™ 8602 (26.65 wt %, Allnex), Photomer® 4356 (11.85 wt %, IGM Resins), Sartomer SR399 (8.88 wt %, Arkema), Ebecryl™ LED 02 (8.88 wt %, Allnex), KTO 46 (2.96 wt %, IGM Resins), and one or more of a Si-containing compound (such as POSS® MA0736 (CAS 1620202-27-8, Hybrid Plastics), POSS® OL1170 (1,3,5,7,9,11,13,15-octavinyl-2,4,6,8,10,12,14,16,17,18,19,20,21-tridecaoxa-115,315,5,7,9,11,13,15-octasilahexacyclo [9.5.1.11,3.13,9.15,15.17,13]henicosane, Hybrid Plastics), or Monomers M1-4; 0.59 wt %, added as a solid or stock solution in PGME) in propylene glycol methyl ether acetate (39.59 wt %, Sigma-Aldrich). The resulting homogeneous mixture was filtered (pore size 0.2 µm, Whatman™), then NANOBYK 3601 (0.59 wt %, BYK USA Inc.) were added, the resulting mixture filtered (pore size 1.0 µm, Whatman™). The final formulation concentration range was adjusted to 20 to 59 wt % solids through further dilution with propylene glycol methyl ether acetate, and another co-solvent as needed.

Example 6: Formulation A-2: Formulation A-2 was prepared by combining Ebecryl™ 8602 (26.65 wt %, Allnex), Photomer® 4356 (11.85 wt %, IGM Resins), Sartomer SR399 (8.88 wt %, Arkema), Ebecryl™ LED 02 (8.88 wt %, Allnex), KTO 46 (2.96 wt %, IGM Resins), and Monomer M2 (0.59 wt %, added as a stock solution in PGME) in propylene glycol methyl ether acetate (39.59 wt %, Sigma-Aldrich). The resulting homogeneous mixture was then filtered (pore size 0.2 µm, Whatman™), then NANOBYK 3601 (0.59 wt %, BYK USA Inc.) were added, the resulting mixture filtered (pore size 1.0 µm, Whatman™). The final formulation concentration range was adjusted to 40 wt % solids through further dilution with propylene glycol methyl ether acetate, and then EEP was added so it constituted 3.90 wt % of the total solvent content in the formulation.

Example 8: Formulation C: Formulation C was prepared by combining Ebecryl™ 8602 (45 parts per weight, Allnex), Photomer® 4356 (20 parts per weight, IGM Resins), Sartomer SR399 (15 parts per weight, Arkema), Ebecryl™ LED 02 (15 parts per weight, Allnex), KTO 46 (5 parts per weight, IGM Resins) in propylene glycol methyl ether acetate (166.67 parts per weight, Sigma-Aldrich). The resulting mixture was filtered (pore size 0.2 µm, Whatman™), then Optool DAC-HP (1 part per weight, Daikin Industries, Ltd.) and NANOBYK-3601 (1 part per weight, BYK USA Inc.) were added, the resulting mixture filtered (pore size 1.0 µm, Whatman™). The final formulation concentration range was adjusted to 20 to 59 wt % solids through further dilution with either propylene glycol methyl ether acetate (Sigma-Aldrich), methyl isobutyl ketone (Sigma-Aldrich), or 2-pentanone (Sigma-Aldrich).

General procedure for preparation of hardcoat articles: Hardcoat articles were prepared from the aforementioned formulations in the following general manner: PET Melinex® 462 (2 mil thick; Tekra, LLC) was cleaned by filtered laboratory air prior to use. An automatic Elcometer draw-down coater was used to cast formulations onto the substrates at room temperature. In more detail, draw-down bars with different gaps were used to obtain the desired coating thickness of 5 µm. The deposited coating was heated at 90° C. for 3 minutes on a stainless-steel hotplate in a fume hood, and then UV-cured using a Fusion LC6B Benchtop Conveyor system with a Fusion UV F300 S source (irradiance –3000 mW/cm$^2$). Each film passed the lamp one, two, or four times at 47 feet per minute each time. The average values for energy density at 47 fpm are around 480, 120, 35, and 570 mJ/cm2 in the UVA, UVB, UVC, and UVV regimes, respectively. The film thickness was verified by using a micrometer from Mitsutoyo (the micrometer was re-zeroed before measurements, and subsequently multiple locations on a given film were measured). In case of formulation C, a final hardcoat article was thus obtained. In case of formulations A-1 and A-2, the thus resulting hardcoat article was then treated in a Nordson AP-300 plasma system (RF power 250 W, base pressure 250 mTorr, process pressure 300 mTorr, N2 0 sccm, O2 100 sccm, time of plasma 300 s), and the treated article were used within 12 hours after the treatment. The thus treated hardcoat article was mounted onto a silicon wafer (200 mm diameter, thickness 725 µm) using 3M Magic™ tape and placed onto a spin coater (Laurell WS-650MZ-8NPPB). A commercially available solution of a highly fluorinated silane (Shin-Etsu Subelyn® KY-1901), further diluted 25-fold using fluorinated solvent Opteon™ SF10 (The Chemours Company FC, LLC) or Vertrel™ MCA (The Chemours Company FC, LLC), was spin cast on the hardcoat article (coating conditions: 250-750 rpm). The treated hardcoat was then cured on a stainless steel hot plate in a fume hood at 150° C. for one hour. Optionally, the final hardcoat article with additional anti-fingerprint layer was then wiped with a tissue wetted with either SF10 or Vertrel MCA to remove any excess uncured silane agent. Using ellipsometry, the thickness of the silane AF-layer was estimated to be in the range of 5-100 nm.

General procedure for performance evaluation using Scratch Resistance Testing: The scratch resistance of all hardcoat articles was evaluated using a Taber Reciprocating Abrader #5900. A piece of hardcoat-coated substrate was flattened onto a glass panel and adhered to the glass panel using 3M Magic™ tape. A piece of steel wool (2×2 cm, #0000, preconditioned by sliding over PET Melinex® 462 for 50 cycles at 1 kgf, 40 cycles/min, scratch length 4 cm) was placed onto the hardcoat, and slid over the hardcoat for up to 10,000 cycles using 1 kgf, 40 cycles/min, and a scratch length of 4 cm. Lastly, the water-contact angle of the hardcoat surface was determined at both an abraded and a non-abraded area on the hardcoat. Static water-contact angles were measured on a Kruss DSA 100 at 23° C. using the sessile drop technique. The volume of the drop placed on the coating was 2 µL, dispensed at 1100 microliter/min. Reported values were an average of multiple individual drops placed along the middle ⅓ of the abraded area or other determined areas of interest, and a linear baseline was assumed.

Figure 2:
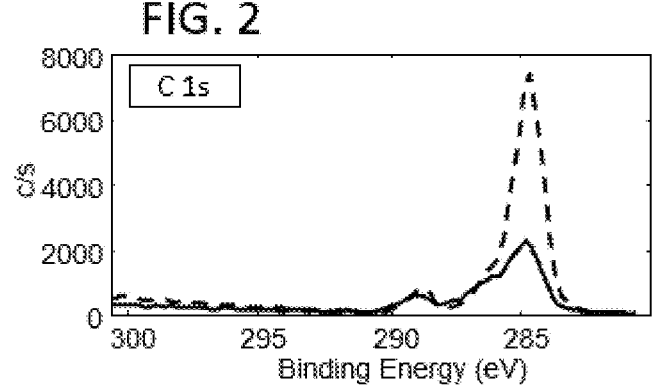
Figure 3:
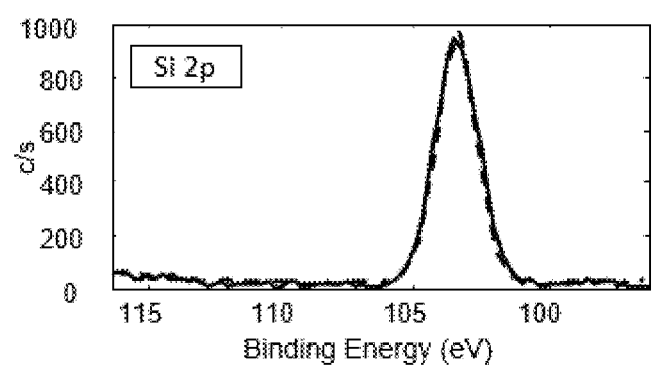
FIGS. 3 and 4 are XPS traces showing the amount of silicon and fluorine detected in the silane-surface layer also containing the anti-fingerprint layer before (dashed) and after (solid) performing more than 4,000 cycles of a steel-wool scratch test as described in Example 10.
Figure 4:
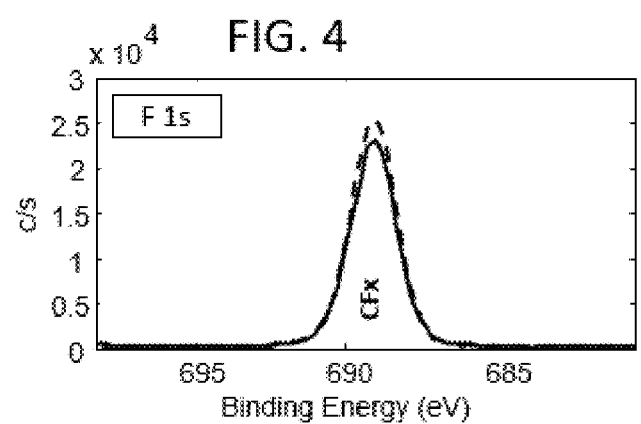
Figure 5:
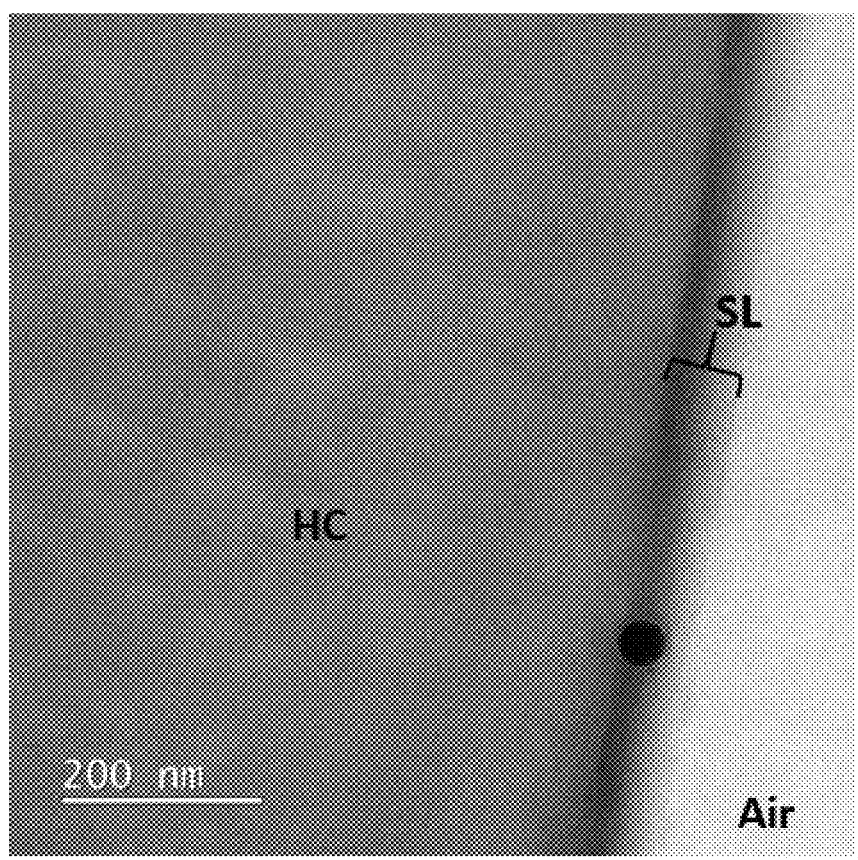
FIG. 5 is a TEM cross-section of the hardcoat article of Example 10, including the surface layer which comprises a layer having a silicon-enriched composition relative to the silicon-content initially contained in the mixture of the non-volatile, uncured components of the hardcoat composition, and an anti-fingerprint layer.
Figure 6:
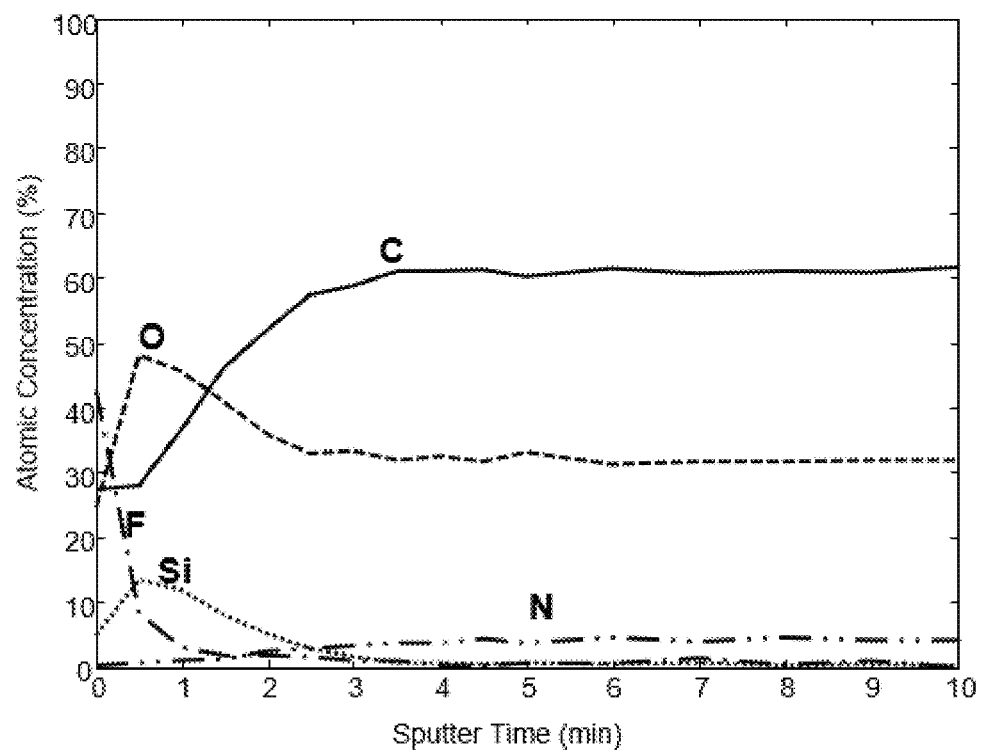
FIG. 6 is an XPS depth profile of Example 10 showing the relative atomic concentration in the hardcoat as a function of depth, wherein a sputtering time of zero corresponds to the hardcoat air-surface.

Example 10: (Scratch Resistance of Formulation A-1+ Monomer M2): A hardcoat formulation A-1 containing monomer M2 as the Si-containing compound was prepared according to the aforementioned procedure. Following the general procedure, a hardcoat article was prepared. A small aliquot of the prepared hardcoat article was then used to elucidate the chemical surface composition of the hardcoat article and how its surface composition had changed in response to exposure of the surface of the hardcoat article to an oxygen-containing plasma. More specifically, XPS was utilized to probe the change in silicon and carbon content near the surface of the hardcoat article in response to exposing said hardcoat aliquot to an oxidizing plasma environment. The XPS results for silicon and carbon are shown in FIGS. 1 and 2, respectively. The silicon content near the surface of the hardcoat article had increased in response to the plasma treatment, whereas the carbon content decreased. Additionally, the silicon peak shifted to higher binding energy, indicating transformation of the Si-containing monomer M2 to an $SiO_x$-like material. Following the general procedure, an additional anti-fingerprint layer based on KY-1901 (Shin Etsu) was then deposited on the prepared hardcoat article. The resulting article showed an initial water-contact angle of 117°. In order to understand the thickness of the surface layer of the hardcoat article that comprises the additional anti-fingerprint layer and the aforementioned silicon-enriched layer an aliquot of the resulting hardcoat article was subjected to TEM cross-sectioning. The result is shown in FIG. 5, which clearly showed the presence of a distinct surface layer (denoted "SL") of thickness 56±35 nm as part of the surface of the final hardcoat article relative to the remainder of the hardcoat article (denoted "HC") located further away from the air-surface interface. Additionally, the elemental composition of an aliquot of the final hardcoat article was probed using XPS. As FIG. 6 shows that the composition of the hardcoat had changed significantly when probing the hardcoat article depth-wise and starting from the air-hardcoat interface. The relative concentrations of oxygen, fluorine, and silicon all reached their highest values close to the surface of the hardcoat article, and then decreased. Conversely, the relative concentrations of carbon and nitrogen assumed their highest values farther away from the surface of the hardcoat article. These results further demonstrated the presence of a distinct surface layer in the hardcoat article. Following the general procedure, a steel wool abrasion test was performed on the hardcoat article containing the additional anti-fingerprint layer to yield a water-contact angle value of 115° after 7,000 cycles. Performing the same steel wool abrasion test on a separate sample for 10,000 cycles yielded a water-contact angle value of 116°. Additionally, the same steel wool abrasion test was performed on another separate sample for more than 4,000 cycles, and the change in chemical surface composition of the hardcoat sample elucidated using XPS. More specifically, XPS was utilized to probe specifically the change in carbon and fluorine content near the surface of the hardcoat article in response to the scratch test performed on the hardcoat sample. The XPS results are shown in FIGS. 3 and 4 and demonstrated that the amount of carbon and fluorine near the surface of the hardcoat article both underwent little to no change in response to the steel wool scratch test, therefore indicating that the steel wool scratch test inflicted little to no damage to the surface of the hardcoat article.

Example 11: (Scratch Resistance of Formulation A-2+ Monomer M2): A hardcoat formulation A-2 containing monomer M2 as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 117°. Following the general procedure a steel wool abrasion test was performed to yield a water-contact angle value of 1140 after 7,000 cycles.

Example 12: (Scratch Resistance of Formulation A-1+ Monomer M1): A hardcoat formulation A-1 containing monomer M1 as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 127°. Following the general procedure a steel wool abrasion test was performed to yield a water-contact angle value of 113° after 7,000 cycles.

Comparative Example 1: (Scratch Resistance of Formulation A-1 with Commercial POSS® OL1170): A hardcoat formulation A-1 containing octavinyl polyhedral oligomeric silsesquioxane (POSS® OL1170, Hybrid Plastics) as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 125°. Following the general procedure a steel wool abrasion test was performed to yield a water-contact angle value of <1000 after 7,000 cycles.

Comparative Example 2: (Scratch Resistance of Formulation A-1 with Commercial POSS® MA0736): A hardcoat formulation A-1 containing POSS® MA0736 (Hybrid Plastics) as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 125°. Following the general procedure a steel wool abrasion test was performed to yield a water-contact angle value of <100° after 7,000 cycles.

Comparative Example 3: (Scratch Resistance of Formulation A-1 with Monomer M3): A hardcoat formulation A-1 containing Monomer M3 as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 116°. Following the general procedure a steel wool abrasion test was performed to yield a water-contact angle value of <100° after 7,000 cycles.

Comparative Example 4: (Scratch Resistance of Formulation A-1 with a Mixture of POSS®): A hardcoat formulation A-1 containing Monomer M2 and POSS® OL1170 (1:1 ratio by weight) as the Si-containing compound was prepared according to the aforementioned procedure. Following the general procedure, a hardcoat article was prepared and an additional anti-fingerprint layer based on KY-1901 (Shin Etsu) deposited thereon. The resulting article showed an initial water-contact angle of 133°. Following the general procedure a steel wool abrasion test was performed to yield a water-contact angle value of <1000 after 7,000 cycles.

Comparative Example 5: (Scratch Resistance of Formulation C): A hardcoat formulation C was prepared according to the aforementioned procedure. The resulting article showed an initial water-contact angle of 111°. Following the general procedure a steel wool abrasion test was performed to yield a water-contact angle value of <1000 after 7,000 cycles. Scratch resistance test results are reported in Table 2.

TABLE 2

| Entry | Hardcoat formulation | Si-containing acrylate monomer | WCA initial [°] | WCA [°] after 7,000 cycles scratch test | Haze before/ after plasma treatment [%] | Transmission [%] |
|---|---|---|---|---|---|---|
| Comparative example 1 | A-1 | OL1170 | 125 | <100 | 0.7 ± 0.1/ 0.7 ± 0.1 | not tested |
| Comparative example 2 | A-1 | MA0736 | 113 | <100 | 0.5 ± 0.1/ 0.5 ± 0.1 | not tested |
| Comparative example 3 | A-1 | M3 | 116 | <100 | 0.7 ± 0.1/ 0.7 ± 0.1 | not tested |
| Comparative example 4 | A-1 | OL1170 + M2 (1:1 w/w) | 133 | <100 | 0.8 ± 0.1/ 1.3 ± 0.1 | 91.4 ± 0.3 |
| Comparative example 5 | C | — | 111 | <100 | 0.4 ± 0.1/ not tested | not tested |
| Example 10 | A-1 | M2 | 117 | 115 116 (10,000 cycles) | 0.6 ± 0.1/ 0.6 ± 0.1 | 90.7 ± 0.3 |
| Example 11 | A-2 | M2 | 117 | 114 | not tested | not tested |
| Example 12 | A-1 | M1 | 127 | 113 | 0.5 ± 0.1/ 3 ± 0.1 | not tested |

What is claimed is:

1. An actinic radiation curable (meth)acrylic composition for use in hardcoats for optical displays comprising: (a) one or more multifunctional (meth)acrylate monomers; (b) one or more Si-containing (meth)acrylate monomers; (c) one or more UV radical initiators; (d) 0.5 to 5 wt. % of one or more monomers containing thiols selected from the group consisting of aliphatic thiols and aromatic thiols to improve surface cure; (e) nanoparticles, and (f) one or more organic solvents.

2. The actinic radiation curable (meth)acrylic composition of claim 1; wherein the one or more Si-containing (meth)acrylate monomers is selected from the group consisting of polyhedral oligomeric silsesquioxanes having one or more of the following Formula 1, Formula 2, Formula 3, Formula 4, and Formula 5:

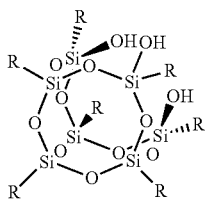

Formula 1

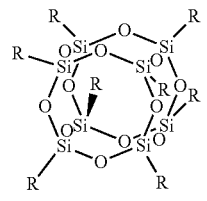

Formula 2

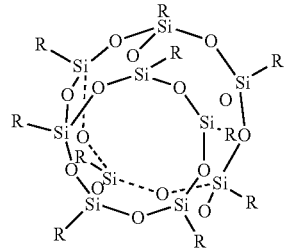

Formula 3

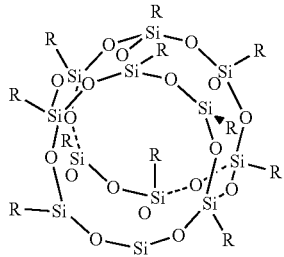

Formula 4

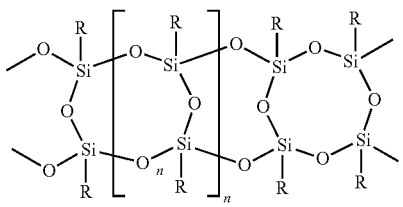

Formula 5 wherein R is the same or different at each occurrence and is selected from the group consisting of hydrogen, deuterium, a halogen, a cyano, a substituted or unsubstituted perfluoro $(C_1-C_{30})$alkyl, a partially fluorinated or perfluorinated polyether, a polyether derived from ethylene oxide, propylene oxide, tetrahydrofurane or analogous heterocycles, a substituted or unsubstituted $(C_1-C_{30})$alkyl, a substituted or unsubstituted $(C_1-C_{30})$alkyl, a substituted or unsubstituted deuterated $(C_1-C_{30})$alkyl, a substituted or unsubstituted $(C_2-C_{30})$alkenyl, a substituted or unsubstituted deuterated $(C_2-C_{30})$alkenyl, a substituted or unsubstituted $(C_2-C_{30})$alkynyl, a substituted or unsubstituted deuterated $(C_2-C_{30})$alkynyl, a substituted or unsubstituted $(C_3-C_{30})$cycloalkyl, a substituted or unsubstituted deuterated $(C_3-C_{30})$cycloalkyl, a substituted or unsubstituted $(C_6-C_{60})$aryl, a substituted or unsubstituted deuterated $(C_6-C_{60})$aryl, a substituted or unsubstituted tri$(C_1-C_{30})$alkylsilyl, a substituted or unsubstituted deuterated tri$(C_1-C_{30})$alkylsilyl, a substituted or unsubstituted tri$(C_6-C_{30})$arylsilyl, a substituted or unsubstituted deuterated tri$(C_6-C_{30})$arylsilyl, a substituted or unsubstituted di$(C_1-C_{30})$alkyl$(C_6-C_{30})$arylsilyl, a substituted or unsubstituted deuterated di$(C_1-C_{30})$alkyl$(C_6-C_{30})$arylsilyl, a substituted or unsubstituted $(C_1-C_{30})$alkyldi$(C_6-C_{30})$arylsilyl, a substituted or unsubstituted deuterated $(C_1-C_{30})$alkyldi ($C_6$-$C_{30}$)arylsilyl, a substituted or unsubstituted mono- or di-($C_6$-$C_{30}$)arylamino, or a substituted or unsubstituted deuterated mono- or di-($C_6$-$C_{30}$)arylamino; or may be linked to an adjacent substituent(s) to form a substituted or unsubstituted ($C_3$-$C_{30}$), mono- or polycyclic, alicyclic or aromatic ring that may or may not contain deuterium, and whose carbon atom(s) may be replaced with at least one hetero atom selected from N, O, and S.

3. The actinic radiation curable (meth)acrylate composition of claim 2; wherein R is the same or different at each occurrence and contains one or more (meth)acrylate groups and one or more (meth)acrylate groups reacted with a thiol-compound comprising a substituted or unsubstituted ($C_6$-$C_{30}$)alkyl group.

4. The actinic radiation curable (meth)acrylic composition of claim 1; wherein the composition comprises from 0.05 to 2.5 wt. % of nanoparticles, and wherein the nanoparticles are selected from the group consisting of suspended silicon oxide nanoparticles and suspended aluminum oxide nanoparticles.

5. The actinic radiation curable (meth)acrylic composition of claim 1; wherein the one or more organic solvents is selected from the group consisting of ketones, ethers, aliphatic hydrocarbons, aromatic hydrocarbons; aromatic alcohols, alkanols, esters, and combinations thereof including combinations comprising multiple functional groups in the one or more organic solvents.

* * * * *